United States Patent
Teran et al.

(10) Patent No.: US 9,543,619 B2
(45) Date of Patent: Jan. 10, 2017

(54) FUNCTIONALIZED PHOSPHORUS CONTAINING FLUOROPOLYMERS AND ELECTROLYTE COMPOSITIONS

(71) Applicant: Blue Current, Inc., Berkeley, CA (US)

(72) Inventors: Alexander Teran, Oakland, CA (US); Benjamin Rupert, Berkeley, CA (US); Eduard Nasybulin, Fremont, CA (US); Joanna Burdynska, Berkeley, CA (US)

(73) Assignee: Blue Current, Inc., Berkeley, CA (US)

( * ) Notice: Subject to any disclaimer, the term of this patent is extended or adjusted under 35 U.S.C. 154(b) by 0 days.

(21) Appl. No.: 15/012,548

(22) Filed: Feb. 1, 2016

(65) Prior Publication Data

US 2016/0226104 A1     Aug. 4, 2016

Related U.S. Application Data

(60) Provisional application No. 62/211,412, filed on Aug. 28, 2015, provisional application No. 62/111,217, (Continued)

(51) Int. Cl.
*H01M 10/0569* (2010.01)
*H01M 10/054* (2010.01)
(Continued)

(52) U.S. Cl.
CPC ..... *H01M 10/0569* (2013.01); *H01M 10/0525* (2013.01); *H01M 10/0565* (2013.01); *H01M 10/0567* (2013.01); *H01M 10/4235* (2013.01)

(58) Field of Classification Search
None
See application file for complete search history.

(56) References Cited

U.S. PATENT DOCUMENTS

| 4,686,241 A | 8/1987 | Fielding et al. |
| 5,132,446 A | 7/1992 | Tonhzuka et al. |

(Continued)

FOREIGN PATENT DOCUMENTS

| EP | 2297220 A1 | 3/2011 |
| EP | 2576656 A1 | 4/2013 |

(Continued)

OTHER PUBLICATIONS

Di Lorenzo, Robert, "Perfluoropolyethers: Analytical Method Development for a New Class of Compounds with the Potential to be Long-Lived Environmental Contaminants," Thesis, Master of Science, Graduate Department of Chemistry, University of Toronto, 2012, pp. 64.

(Continued)

*Primary Examiner* — Patrick Ryan
*Assistant Examiner* — Christopher Domone
(74) *Attorney, Agent, or Firm* — Weaver Austin Villeneuve & Sampson LLP

(57) ABSTRACT

Provided herein are functionally substituted fluoropolymers suitable for use in liquid and solid non-flammable electrolyte compositions. The functionally substituted fluoropolymers include phosphate-terminated or phosphonate-terminated perfluoropolyethers (PFPEs) having high ionic conductivity. Also provided are non-flammable electrolyte compositions including phosphate-terminated or phosphonate-terminated perfluoropolyethers (PFPEs) and alkali-metal ion batteries including the non-flammable electrolyte compositions.

30 Claims, 8 Drawing Sheets

Related U.S. Application Data filed on Feb. 3, 2015, provisional application No. 62/147,047, filed on Apr. 14, 2015.

(51) Int. Cl.
| | |
|---|---|
| *H01M 10/0565* | (2010.01) |
| *H01M 10/0525* | (2010.01) |
| *H01M 10/0567* | (2010.01) |
| *H01M 10/42* | (2006.01) |

(56) References Cited

U.S. PATENT DOCUMENTS

| | | | |
|---|---|---|---|
| 5,874,169 | A | 2/1999 | Falcone et al. |
| 6,235,689 | B1 | 5/2001 | Falcone |
| 2003/0027732 | A1 | 2/2003 | Howell et al. |
| 2009/0111019 | A1* | 4/2009 | Hirose .......... H01M 4/133 429/199 |
| 2009/0197090 | A1 | 8/2009 | Hahn et al. |
| 2009/0291364 | A1 | 11/2009 | Koh et al. |
| 2010/0183889 | A1 | 7/2010 | Dams et al. |
| 2010/0216035 | A1 | 8/2010 | Iwanaga et al. |
| 2011/0189395 | A1 | 8/2011 | Padigala et al. |
| 2012/0141878 | A1 | 6/2012 | Ohashi et al. |
| 2013/0068408 | A1 | 3/2013 | Tonelli et al. |
| 2013/0248257 | A1 | 9/2013 | Naegel et al. |
| 2014/0137766 | A1 | 5/2014 | Chaffins et al. |
| 2015/0093654 | A1 | 4/2015 | Galiano et al. |
| 2016/0043435 | A1* | 2/2016 | DeSimone .......... H01M 10/05 429/316 |

FOREIGN PATENT DOCUMENTS

| | | |
|---|---|---|
| EP | 2596074 A1 | 5/2013 |
| FR | 2989683 | 10/2013 |
| WO | 2011/151230 | 12/2011 |
| WO | 2014/204547 | 12/2014 |
| WO | 2014204547 | 12/2014 |

OTHER PUBLICATIONS

Russo, et al., "New developments in the synthesis and characterization of phosphate esters of linear (per)fluoropolyether monofunctional and difunctional macromonomers," *Journal of Polymer Science: Part A: Polymer Chemistry*, vol. 43, 2005, 4790-4804.

Bradley, et al., "Evaluation of Boundary-Enhancement Additives for Perfluroropolyethers," *NASA Technical Memorandum 107393*, 1997 Tribology Conference, Sep. 8-12, 1997, pp. 24.

Wong, Dominica H.C., "Nonflammable perfluoropolyether-based electrolytes for lithium batteries," PNAS, Mar. 4, 2014, vol. 111, No. 9, pp. 3327-3331.

International Search Report and Written Opinion dated Apr. 11, 2016 in PCT/US2016/16188.

International Search Report and Written Opinion dated Feb. 2, 2016 issued in PCT Application No. PCT/US16/16221.

Office Action issued in U.S. Appl. No. 15/012,444, dated Jun. 22, 2016.

Final Office Action issued in U.S. Appl. No. 15/012,444, dated Oct. 12, 2016.

Arai et al., Machine translation of JP 2000-327634 A, Nov. 2000.

\* cited by examiner

FUNCTIONALIZED PHOSPHORUS CONTAINING FLUOROPOLYMERS AND ELECTROLYTE COMPOSITIONS

CROSS-REFERENCE TO RELATED APPLICATIONS

This application claims priority to the following U.S. Provisional patent applications: U.S. Provisional Patent Application No. 62/111,217, filed Feb. 3, 2015, titled "FUNCTIONALIZED FLUOROPOLYMERS," U.S. Provisional Patent Application No. 62/147,047, filed Apr. 14, 2015, also titled "FUNCTIONALIZED FLUOROPOLYMERS," and U.S. Provisional Patent Application No. 62/211,412, filed Aug. 28, 2015, titled "FUNCTIONALIZED PHOSPHORUS CONTAINING FLUOROPOLYMERS." Each of these applications is incorporated by reference herein in its entirety.

BACKGROUND

Lithium-ion (Li-ion) and other alkali metal salt batteries are of great interest as a renewable energy source. Li-ion batteries are the dominant secondary battery for consumer electronics, and have potential for other applications such as energy storage. However, commercially available Li-ion batteries typically include electrolytes having high volatility and flammability. In faulty batteries or batteries exposed to extreme conditions, these electrolytes can cause serious fires. These safety concerns limit the use of Li-ion battery technology in fields that use large-scale batteries including home and grid storage and transportation applications.

SUMMARY

Some embodiments described herein may comprise a functionally substitute perfluoropolyether according to Formula I or Formula II:

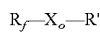  (I)

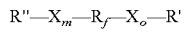  (II)

wherein 'R$_f$' is a perfluoropolyether backbone; X is an alkyl, fluoroalkyl, ether, or fluoroether group, wherein 'm' and 'o' are each independently zero or an integer ≥1; and R" and R' are each independently selected from the group consisting of phosphate or phosphonate containing groups. In some aspects, the functionalized perfluoropolyethers described herein have a number average molecular weight of about 200 g/mol to about 5,000 g/mol. In some aspects, the perfluoropolyethers described herein have a group (X) as defined by Formula I and Formula II comprising an ether linkage. In some aspects, X is a lower alkyl linkage.

In some embodiments, the one or more groups of the functionalized perfluoropolyethers described herein may comprise one or more phosphate or phosphonate groups comprising structure S1 or S2

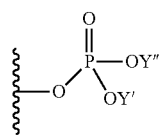  S1

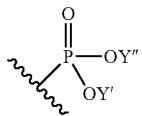  S2 wherein Y' and Y" each independently comprise an additional aliphatic, alkyl, aromatic, heterocyclic, phosphate, or phosphonate containing groups. In another aspect, the Y' and Y" of the functionalized perfluoropolyethers described herein comprise a methyl group according to structure S3

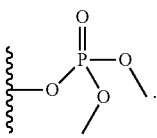  S3

In one aspect, the functionalized perfluoropolyether comprises a structure according to structure S4

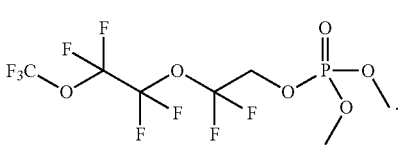  S4

In one aspect, the functionalized perfluoropolyether comprises a structure according to structure S11

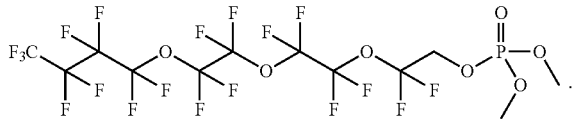  S11

One embodiment described herein is a method of making the perfluoropolyether according to structure S4 comprising the steps of: a) charging a first suitable reaction chamber with sodium hydride or potassium tert-butoxide and tetrahydrofuran; b) adding a perfluoropolyether alcohol to the first suitable reaction chamber to form a first reaction mixture that undergoes a chemical reaction to form a solution comprising a sodium or a potassium perfluoropolyether alkoxide; c) charging a second suitable reaction chamber with tetrahydrofuran and a dialkyl phosphate: XP(O)OR$_a$-OR$_b$, wherein X=Cl, Br, I and R$_a$ and R$_b$ are each independently an alkyl group with between 1 and 5 carbon atoms; d) adding the solution comprising the sodium or potassium perfluoropolyether alkoxide to the second suitable reaction chamber to form a second reaction mixture that undergoes a chemical reaction to form a solution comprising a perfluoropolyether dialkyl phosphate; and e) isolating the perfluoropolyether.

Another embodiment described herein is a non-flammable liquid or solid electrolyte composition, which may comprise any functionalized perfluoropolyether described herein and an alkali metal salt. In some aspects, the functionalized perfluoropolyether may comprise from about 10% to about 85% of the non-flammable liquid or solid electrolyte composition. In some aspects, the functionalized perfluoropolyether may comprise from about 10% to about 25% of the non-flammable liquid or solid electrolyte composition. In some aspects, the functionalized perfluoropolyether may comprise from about 40% to about 85% of the non-flammable liquid or solid electrolyte composition. In some aspects, the alkali metal salt may comprise a lithium salt or a sodium salt. In one aspect, the alkali metal salt is a lithium salt comprising $LiPF_6$ or LiTFSI or a mixture thereof. In another aspect, $LiPF_6$ or LiTFSI or a mixture thereof may comprise about 15% to about 35% of the non-flammable liquid or solid electrolyte composition.

In some embodiments, the non-flammable liquid or solid electrolyte compositions described herein may further comprise at least one or more of a conductivity enhancing additive, a viscosity reducer, a high voltage stabilizer, a wettability additive, or a flame retardant, or a mixture or combination thereof.

In some embodiments, the conductivity enhancing additive may comprise ethylene carbonate (EC), propylene carbonate (PC), butylene carbonate (BC), fluoroethylene carbonate, γ-butyrolactone, or a mixture or combination thereof In one aspect, the conductivity enhancing agent comprises ethylene carbonate.

In some embodiments described herein, the conductivity enhancing additive may comprise about 1% to about 40% of the non-flammable liquid or solid electrolyte composition.

In some embodiments, the high voltage stabilizer may comprise 3-hexylthiophene, adiponitrile, sulfolane, lithium bis(oxalato)borate, γ-butyrolactone, 1,1,2,2-tetrafluoro-3-(1, 1,2,2-tetrafluoroethoxy)-propane, ethyl methyl sulfone, or trimethylboroxine or a mixture or combination thereof.

In some embodiments, the wettability additive may comprise triphenyl phosphite, dodecyl methyl carbonate, methyl 1-methylpropyl carbonate, methyl 2,2-dimethylpropanoate, or phenyl methyl carbonate or a mixture or combination thereof.

In some embodiments, the viscosity reducer, high voltage stabilizer, and wettability additives described herein may each independently comprise about 0.5-6% of the non-flammable liquid or solid electrolyte composition and the flame retardant comprises about 0.5-20% of the non-flammable liquid or solid electrolyte composition.

In some embodiments, the non-flammable liquid or solid electrolyte compositions described herein have an ionic conductivity of from 0.01 mS/cm to about 10 mS/cm at 25° C.

In some embodiments, the non-flammable liquid or solid electrolyte compositions described herein does not ignite when heated to a temperature of about 150° C. and subjected to an ignition source for at least 15 seconds.

One aspect of the disclosure relates to functionally substituted perfluoropolyethers according to Formula VII:

R'—X—$R_f$ (VII)

wherein
R' is an unsubstituted lower alkyl linear phosphate or phosphonate group, X is an alkyl, alkoxy, or ether group, and $R_f$ is a branched or unbranched linear perfluoropolyether having a molar mass of between 200 g/mol and 550 g/mol.

In some embodiments of a functionally substituted perfluoropolyether according to Formula VII, R' is ethyl phosphate or methyl phosphate. In some embodiments of a functionally substituted perfluoropolyethers according to Formula VII, $R_f$ has no more than two ether units. In some embodiments, $R_f$ has two at least two ether subunits independently selected from —$(CF_2CF(CF_3)O)$—, —$(CF(CF_3)CF_2O)$—, —$(CF(CF_3)O)$—, —$(CF_2O)$—, or —$(CF_2CF_2O)$—. In some embodiments, $R_f$ has one or more ether subunits of —$(CF_2CF_2O)$—. In some embodiments, $R_f$ has one or more ether subunits of —$(CF_2CF(CF_3)O)$—. In some embodiments, $R_f$ has one or more ether subunits of —$(CF(CF_3)CF_2O)$—. In some embodiments, $R_f$ has one or more ether subunits of —$CF(CF_3)O$. In some embodiments, $R_f$ has one or more ether subunits of —$(CF_2O)$—. In some embodiments, $R_f$ is —$CF_2OCF_2CF_2OCF_3$. In some embodiments, $R_f$ is —$CF_2OCF_2CF_2OCF_2CF_2CF_3$. In some embodiments, $R_f$ is —$CF_2OCF_2CF_2OCF_2CF_2OCF_2CF_2CF_2CF_3$. In some embodiments, $R_f$ is —$CF_2OCF_2CF_2OCF_2CF_2O_2CF_3$. In some embodiments of a functionally substituted perfluoropolyether according to Formula VII, $R_f$ is unbranched or if branched, the branch point is at least two chain units away from R'. In the same or other embodiments, X is $CH_2$, $CH_2CH_2$, $CH_2O$, or $CH_2CH_2O$.

In some embodiments of a functionally substituted perfluoropolyether according to Formula VII, $R_f$ has a molar mass of between 200 g/mol and 500 g/mol, between 200 g/mol and 450 g/mol, between 200 g/mol and 400 g/mol, between 200 g/mol and 350 g/mol, or between 200 g/mol and 300 g/mol.

In some embodiments of a functionally substituted perfluoropolyether according to Formula VII, R' is a methyl or ethyl phosphate group, $R_f$ is unbranched or if branched, the branch point is at least two chain units away from R', and X is $CH_2$, $CH_2CH_2$, $CH_2O$, or $CH_2CH_2O$. In some embodiments of a functionally substituted perfluoropolyether according to Formula VIII, R' is a methyl phosphate group, $R_f$ is unbranched or if branched, the branch point is at least two chain units away from R', and X is $CH_2$.

Another aspect of the disclosure relates to a non-flammable electrolyte composition comprising: an electrolyte liquid comprising a functionally substituted perfluoropolyether according to Formula VII and an alkali metal salt. In some embodiments, the functionalized perfluoropolyether comprises about 30% to about 85% of the electrolyte composition. In some embodiments, the functionalized perfluoropolyether comprises about 40% to about 85% of the electrolyte composition. In some embodiments, the functionalized perfluoropolyether comprises is the largest component by weight of the electrolyte solvent.

In some embodiments of the non-flammable electrolyte composition, R' is ethyl carbonate or methyl phosphate. In some embodiments, $R_f$ has no more than two ether units. In some embodiments, $R_f$ has two at least two ether subunits independently selected from —$(CF_2CF(CF_3)O)$—, —$(CF(CF_3)CF_2O)$—, —$(CF(CF_3)O)$—, —$(CF_2O)$—, or —$(CF_2CF_2O)$—. In some embodiments, $R_f$ has one or more ether subunits of —$(CF_2CF_2O)$—. In some embodiments, $R_f$ has one or more ether subunits of —$(CF_2CF(CF_3)O)$—. In some embodiments, $R_f$ has one or more ether subunits of —$(CF(CF_3)CF_2O)$—. In some embodiments, $R_f$ has one or more ether subunits of —$CF(CF_3)O$. In some embodiments, $R_f$ has one or more ether subunits of —$(CF_2O)$—. In some embodiments, $R_f$ is —$CF_2OCF_2CF_2OCF_3$. In some embodiments, $R_f$ is —$CF_2OCF_2CF_2OCF_2CF_2CF_3$. In some embodiments, $R_f$ is —$CF_2OCF_2CF_2OCF_2CF_2OCF_2CF_2CF_3$. In some embodiments, $R_f$ is —$CF_2OCF_2CF_2OCF_2CF_2O_2CF_3$. In some embodiments, $R_f$ is unbranched or if branched, the branch point is at least two chain units away from R'. In the same or other embodiments, X is $CH_2$, $CH_2CH_2$, $CH_2O$, or $CH_2CH_2O$.

In some embodiments of the non-flammable electrolyte composition, $R_f$ has a molar mass of between 200 g/mol and 500 g/mol, between 200 g/mol and 450 g/mol, between 200 g/mol and 400 g/mol, between 200 g/mol and 350 g/mol, or between 200 g/mol and 300 g/mol.

In some embodiments of the non-flammable electrolyte composition, R' is a methyl or ethyl phosphate group, $R_f$ is unbranched or if branched, the branch point is at least two chain units away from R', and X is $CH_2$, $CH_2CH_2$, $CH_2O$, or $CH_2CH_2O$. In some embodiments, R' is a methyl phosphate group, $R_f$ is unbranched or if branched, the branch point is at least two chain units away from R', and X is $CH_2$.

In some aspects, the functionalized perfluoropolyether may comprise from about 10% to about 85% of the non-flammable electrolyte composition. In some aspects, the functionalized perfluoropolyether may comprise from about 10% to about 25% of the non-flammable liquid or solid electrolyte composition. In some aspects, the functionalized perfluoropolyether may comprise from about 40% to about 85% of the non-flammable liquid or solid electrolyte composition. In some aspects, the alkali metal salt may comprise a lithium salt or a sodium salt. In one aspect, the alkali metal salt is a lithium salt comprising $LiPF_6$ or LiTFSI or a mixture thereof. In another aspect, $LiPF_6$ or LiTFSI or a mixture thereof may comprise about 15% to about 35% of the non-flammable liquid or solid electrolyte composition.

In some embodiments, the non-flammable electrolyte composition may further comprise at least one or more of a conductivity enhancing additive, a viscosity reducer, a high voltage stabilizer, a wettability additive, or a flame retardant, or a mixture or combination thereof. In some embodiments, the conductivity enhancing additive may comprise ethylene carbonate (EC), propylene carbonate (PC), butylene carbonate (BC), fluoroethylene carbonate, γ-butyrolactone, or a mixture or combination thereof In one aspect, the conductivity enhancing agent comprises ethylene carbonate. In some embodiments described herein, the conductivity enhancing additive may comprise about 1% to about 40% of the non-flammable liquid or solid electrolyte composition. In some embodiments, the high voltage stabilizer may comprise 3-hexylthiophene, adiponitrile, sulfolane, lithium bis(oxalato)borate, γ-butyrolactone, 1,1,2,2-tetrafluoro-3-(1, 1,2,2-tetrafluoroethoxy)-propane, ethyl methyl sulfone, or trimethylboroxine or a mixture or combination thereof. In some embodiments, the wettability additive may comprise triphenyl phosphite, dodecyl methyl carbonate, methyl 1-methylpropyl carbonate, methyl 2,2-dimethylpropanoate, or phenyl methyl carbonate or a mixture or combination thereof. In some embodiments, the viscosity reducer, high voltage stabilizer, and wettability additives described herein may each independently comprise about 0.5-6% of the non-flammable liquid or solid electrolyte composition and the flame retardant comprises about 0.5-20% of the non-flammable electrolyte composition.

In some embodiments, the non-flammable electrolyte composition has an ionic conductivity of from 0.01 mS/cm to about 10 mS/cm at 25° C. In some embodiments, the non-flammable compositions does not ignite when heated to a temperature of about 150° C. and subjected to an ignition source for at least 15 seconds.

Another aspect of the disclosure may be implemented in a battery comprising: (a) an anode; (b) a separator; (c) a cathode; (d) at least one cathode current collector; and (e) any non-flammable liquid or solid electrolyte composition described herein. In some aspects, the cathode current collector may comprise aluminum. In some aspects, the non-flammable liquid or solid electrolyte composition may comprise a functionalized perfluoropolyether as described herein and LiTFSI. In some aspects, the non-flammable liquid or solid electrolyte composition may further comprise at least one or more conductivity enhancing additives comprising ethylene carbonate. In some aspects, the non-flammable liquid or solid electrolyte composition further comprises at least one or more of a viscosity reducer, a high voltage stabilizer, or a wettability additive, or a mixture or combination thereof. In some aspects, the batteries described herein have an operating temperature of about −30° C. to about 160° C.

Another embodiment described herein is a battery described herein, wherein the non-flammable liquid or solid electrolyte composition prevents or reduces corrosion of the cathode aluminum current collector as compared to a reference battery comprising one or more organic carbonate solvents and LiTFSI, wherein the reference battery does not have a functionalized perfluoropolyether as described herein.

Another embodiment described herein is a battery as described herein, wherein the non-flammable liquid or solid electrolyte composition prevents or reduces the flammability of the battery as compared to a reference battery comprising one or more organic carbonate solvents and LiTFSI, wherein the reference battery does not have a functionalized perfluoropolyether as described herein.

Another embodiment described herein is a method of preventing or reducing the flammability and gaseous explosion risk of a susceptible alkali metal battery comprising supplementing the battery with a non-flammable liquid or solid electrolyte composition comprising a functionalized perfluoropolyether described herein and a stable lithium salt. In some aspects, the stable lithium salt may comprise LiTFSI.

Another embodiment described herein a method of preventing or reducing corrosion of a susceptible cathode aluminum current collector in contact with an electrolyte composition comprising a lithium sulfonimide salt, the method comprising supplementing the electrolyte composition with a functionalized perfluoropolyether described herein.

DETAILED DESCRIPTION

Figure 1:
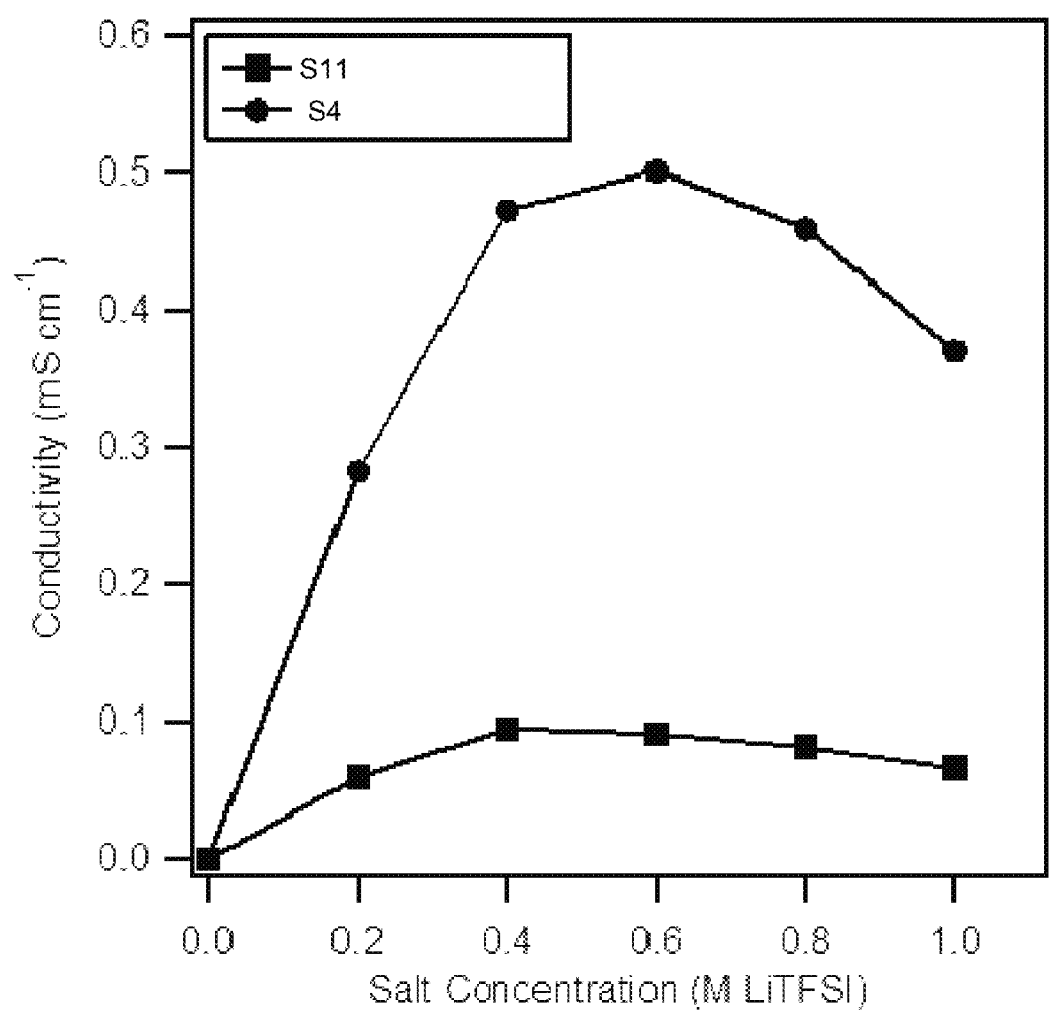
FIG. 1 Ionic conductivity of ether-linked phosphate substituted perfluoropolyether based electrolyte compositions with different concentrations of LiTFSI FIG. 2 Ionic conductivity of an ether-linked phosphate substituted perfluoropolyether based electrolyte compositions across a range of temperatures FIG. 3 Ionic conductivity of an ether-linked phosphate substituted perfluoropolyether based electrolyte compositions with different additives and $LiPF_6$ across a range of temperatures FIG. 4 Ionic conductivity of an ether-linked phosphate substituted perfluoropolyether based electrolyte compositions with different additives and LiTFSI across a range of temperatures FIG. 5 Cathodic scan cyclic voltammetry data of ether-linked phosphate substituted perfluoropolyethers based electrolyte composition FIG. 6 Anodic scan cyclic voltammetry data of ether-linked phosphate substituted perfluoropolyethers based electrolyte composition FIG. 7 Cycling performance and coulombic efficiency of an ether-linked phosphate substituted perfluoropolyether electrolyte composition in full cell coin cell batteries.

The following paragraphs define in more detail the embodiments of the invention described herein. The following embodiments are not meant to limit the invention or narrow the scope thereof, as it will be readily apparent to one of ordinary skill in the art that suitable modifications and adaptations may be made without departing from the scope of the invention, embodiments, or specific aspects described herein.

Described herein are novel functionally substituted fluoropolymers, non-flammable electrolyte compositions, and alkali metal batteries. Also described herein are methods for manufacturing the fluoropolymers and compositions described herein.

For purposes of interpreting this specification, the following terms and definitions will apply and whenever appropriate, terms used in the singular will also include the plural and vice versa. In the event that any definition set forth below conflicts with any document incorporated herein by reference, the definition set forth below shall control.

The term "alkyl" as used herein alone or as part of another group, refers to a straight or branched chain hydrocarbon containing any number of carbon atoms, including from 1 to 10 carbon atoms, 1 to 20 carbon atoms, or 1 to 30 or more carbon atoms and that include no double or triple bonds in the main chain. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Lower alkyl" as used herein, is a subset of alkyl and refers to a straight or branched chain hydrocarbon group containing from 1 to 4 carbon atoms. Representative examples of lower alkyl include, but are not limited to, methyl, ethyl, n-propyl, iso-propyl, n-butyl, iso-butyl, tert-butyl, and the like. The term "alkyl" or "lower alkyl" is intended to include both substituted and unsubstituted alkyl or lower alkyl unless otherwise indicated.

The term "cycloalkyl" as used herein alone or as part of another group, refers to a saturated or partially unsaturated cyclic hydrocarbon group containing from 3, 4 or 5 to 6, 7 or 8 carbons (which carbons may be replaced in a heterocyclic group as discussed below). Representative examples of cycloalkyl include cyclopropyl, cyclobutyl, cyclopentyl, cyclohexyl, cycloheptyl, and cyclooctyl. These rings may be optionally substituted with additional substituents as described herein such as halo or lower alkyl. The term "cycloalkyl" is generic and intended to include heterocyclic groups as discussed below unless specified otherwise.

The term "alkoxy" as used herein alone or as part of another group, refers to an alkyl or lower alkyl group, as defined herein (and thus including substituted versions such as polyalkoxy), appended to the parent molecular moiety through an oxy group, —O—. Representative examples of alkoxy include, but are not limited to, methoxy, ethoxy, propoxy, 2-propoxy, butoxy, tert-butoxy, pentyloxy, hexyloxy and the like. In some aspects, alkoxy groups, when part of a more complex molecule, comprise an alkoxy substituent attached to an alkyl or lower alkyl via an ether linkage.

The term "halo" as used herein refers to any suitable halogen, including —F, —Cl, —Br, and —I.

The term "cyano" as used herein refers to a CN group.

The term "carboxylic acid" as used herein refers to a —C(O)OH group.

The term "hydroxyl" as used herein refers to an —OH group.

The term "sulfoxyl" as used herein refers to a compound of the formula —S(O)R, where R is any suitable substituent such as alkyl, cycloalkyl, alkenyl, alkynyl or aryl.

The term "carbonate" as used herein alone or as part of another group refers to a —OC(O)OR radical, where R is any suitable substituent such as aryl, alkyl, alkenyl, alkynyl, cycloalkyl or other suitable substituent as described herein.

The term "cyclic carbonate" as used herein refers to a heterocyclic group containing a carbonate.

The term "ester" as used herein alone or as part of another group refers to a —C(O)OR radical, where R is any suitable substituent such as alkyl, cycloalkyl, alkenyl, alkynyl or aryl.

The term "ether" as used herein alone or as part of another group refers to a —COR radical where R is any suitable substituent such as alkyl, cycloalkyl, alkenyl, alkynyl, or aryl.

The term "fluoroalkyl" as used herein alone or as part of another group refers to any alkyl substituted with one or more fluorine atoms.

The term "fluoroether" as used herein alone or as part of another group refers to a —CF$_n$OCF$_n$R radical, where R is any suitable substituent such as alkyl, cycloalkyl, alkenyl, alkynyl or aryl and n is ≥1.

The term "phosphate" as used herein refers to a —OP(O)OR$_a$OR$_b$ radical, where R$_a$ and R$_b$ are independently any suitable substituent such as alkyl, cycloalkyl, alkenyl, alkynyl or aryl or a hydrogen atom.

The term "phosphone" or "phosphonate" as used herein refers to a —P(O)OR$_a$OR$_b$ radical, where R$_a$ and R$_b$ are independently any suitable substituent such as alkyl, cycloalkyl, alkenyl, alkynyl or aryl or a hydrogen atom.

The term "nitrile" as used herein refers to a —C≡N group.

The term "sulfonate" as used herein refers to a —S(O)(O)OR radical, where R is any suitable substituent such as alkyl, cycloalkyl, alkenyl, alkynyl or aryl.

The term "sulfone" as used herein refers to a —S(O)(O)R radical, where R is any suitable substituent such as alkyl, cycloalkyl, alkenyl, alkynyl or aryl.

The term "urea" as used herein alone or as part of another group refers to an N(R$_e$)C(O)NR$_a$R$_b$ radical, where R$_a$ and R$_b$ and R$_e$ are any suitable substituent such as H, alkyl, cycloalkyl, alkenyl, alkynyl or aryl.

The term "fluoropolymer" as used herein alone or as part of another group refers to a branched or unbranched fluorinated chain including two or more C—F bonds. The term "perfluorinated" as used herein refers to a compound or part thereof that includes C—F bonds and no C—H bonds. The term perfluoropolymer as used herein alone or as part of another group refers to a fluorinated chain that includes multiple C—F bonds and no C—H bonds with the exception of C—H bonds that may be present at terminal groups of the chain as described with reference to Formulas V and VI below.

Examples of fluoropolymers include but are not limited to fluoropolyethers, and perfluoropolyethers (i.e., PFPE(s)), poly(perfluoroalkyl acrylate), poly(perfluoroalkyl methacrylate), polytetrafluoroethylene, polychlorotrifluoroethylene, polyvinylidene fluoride, and copolymers of any of the forgoing. See, e.g., U.S. Pat. Nos. 8,361,620; 8,158,728 (DeSimone et al.); and 7,989,566, each of which is incorporated by reference herein.

It should be noted that in some embodiments the fluoropolymers described herein are significantly smaller than conventional polymers, which contain many repeated subunits.

The term "perfluoropolyether" or PFPE as used herein alone or as part of another group refers to a chain including two or more ether groups and no C—H bonds with the exception of C—H bonds that may be present at terminal groups of the chain as described with reference to Formulas V and VI below. Examples include but are not limited to polymers that include a segment such as difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or tetrafluoroethylene oxide-co-hexafluoropropylene oxide-co-difluoromethylene oxide and combinations thereof. See, e.g., U.S. Pat. No. 8,337,986, which is incorporated by reference herein for its teachings thereof. Additional examples include but are not limited to those described in P. Kasai et al., Applied Surface Science 51, 201-211 (1991); J. Pacansky and R. Waltman, Chem. Mater. 5, 486-494 (1993); K. Paciorek and R. Kratzer, Journal of Fluorine Chemistry 67, 169-175 (1994); M. Proudmore et al., Journal of Polymer Science: Part A: Polymer Chemistry, 33, 1615-1625 (1995); J. Howell et al., Journal of Fluorine Chemistry 125, 1513-1518 (2004); and in U.S. Pat. Nos. 8,084,405; 7,294,731; 6,608,138; 5,612,043; 4,745,009; and 4,178,465, each of which are incorporated by reference herein for their teachings thereof.

The term "functionally substituted" as used herein refers to a substituent covalently attached to a parent molecule. In some aspects described herein, the parent molecule is a fluorinated ether or perfluoropolyether as further described herein (e.g., with or without an additional linking group). In some aspects, the substituent comprises one or more polar moieties. In some aspects, the presence of the substituent (e.g., one or more polar moieties) functions to disassociate and coordinate alkali metal salts under certain conditions as further described herein. The term "functionally substituted perfluoropolyether" refers to a compound including a PFPE as described above and one or more functional groups covalently attached to the PFPE. The functional groups may be directly attached to the PFPE or attached to the PFPE by a linking group. The functional groups and the linking groups, if present, may be non-fluorinated, partially fluorinated, or perfluorinated. The term "functionally substituted perfluoropolyether" may be used interchangeably with the term "functionalized perfluoropolyether."

The term "inert gas" is known and generally refers to any gas which does not undergo a chemical reaction or react with a given set of substances in a chemical reaction. Non-limiting examples of inert gases useful for the methods and compositions described herein comprise a noble gas (i.e., helium, neon, argon, krypton, xenon, or radon), nitrogen, or water-free air, or a mixture or combination thereof. In some embodiments described herein, an inert gas is used in the methods of synthesizing a perfluoropolyether as described herein.

The term "non-flammable" as used herein means a compound or solution (e.g., an electrolyte solution) that does not easily ignite, combust, or catch fire.

The term "flame retardant" as used herein refers to a compound that is used to inhibit, suppress, or delay the spread of a flame, fire, or a combustion of one or more materials.

The term "functionally substituted" as used herein refers to a substituent covalently attached to a parent molecule. In some aspects described herein, the parent molecule is a fluorinated ether or perfluoropolyether as further described herein (e.g., with or without an additional linking group). In some aspects, the substituent comprises one or more polar moieties. In some aspects, the presence of the substituent (e.g., one or more polar moieties) functions to disassociate and coordinate alkali metal salts under certain conditions as further described herein.

The term "number average molecular weight" or "$M_n$" refers to the statistical average molecular weight of all molecules (e.g., perfluoropolyethers) in the sample expressed in units of g/mol. The number average molecular weight may be determined by techniques known in the art, such as gel permeation chromatography (wherein $M_n$ can be calculated based on known standards based on an online detection system such as a refractive index, ultraviolet, or other detector), viscometry, mass spectrometry, or colligative methods (e.g., vapor pressure osmometry, end-group determination, or proton NMR). The number average molecular weight is defined by the equation below, $$M_n = \frac{\sum N_i M_i}{\sum N_i}$$

wherein $M_i$ is the molecular weight of a molecule and $N_i$ is the number of molecules of that molecular weight.

The term "weight average molecular weight" or "$M_w$" refers to the statistical average molecular weight of all molecules (e.g., perfluoropolyethers), taking into account the weight of each molecule in determining its contribution to the molecular weight average, expressed in units of g/mol. The higher the molecular weight of a given molecule, the more that molecule will contribute to the $M_w$ value. The weight average molecular weight may be calculated by techniques known in the art which are sensitive to molecular size, such as static light scattering, small angle neutron scattering, X-ray scattering, and sedimentation velocity. The weight average molecular weight is defined by the equation below, $$M_w = \frac{\sum N_i M_i^2}{\sum N_i M_i}$$

wherein '$M_i$' is the molecular weight of a molecule and '$N_i$' is the number of molecules of that molecular weight.

The term "polydispersity index" or "PDI" refers to the breadth of the molecular weight distribution of a population of molecules (e.g., a population of perfluoropolyether molecules). The polydispersity index is defined by the equation below, $$PDI = \frac{M_w}{M_n}$$

wherein 'PDI' is the ratio of the weight average molecular weight '$M_w$' as described herein to the number average molecular weight '$M_n$' as described herein. All molecules in a population of molecules (e.g., perfluoropolyethers) that is monodisperse have the same molecular weight and that population of molecules has a PDI or $M_w/M_n$ ratio equal to 1.

The term "molar mass" refers to the mass of a chemical compound or group thereof divided by its amount of substance. In the below description, references to weight average molecular weight or number average molecular weight may be alternatively taken to be the molar mass of a single molecule or a population of molecules having a PDI of 1.

The term "substantially" as used herein means to a great or significant extent, but not completely. In some aspects, substantially means about 90% to 99% or more in the various embodiments described herein, including each integer within the specified range.

The term "about" as used herein refers to any value that is within a variation of up to ±10% of the value modified by the term "about."

The term "at least about" as used herein refers to a minimum numerical range of values (both below and above a given value) that has a variation of up to ±10% of the value modified by the term "about."

As used herein, "a" or "an" means one or more unless otherwise specified.

Terms such as "include," "including," "contain," "containing," "has," or "having" and the like mean "comprising."

The term "or" can be conjunctive or disjunctive.

Functionally Substituted Fluoropolymers

In some embodiments, the functionally substituted fluoropolymers described herein comprise compounds of Formula I and Formula II:

$$R_f—X_o—R' \qquad (I)$$

$$R''—X_m—R_f—X_o—R' \qquad (II)$$

wherein:

$R_f$ is a fluoropolymer (e.g., a perfluoropolyether) backbone;

X is an alkyl, fluoroalkyl, ether, or fluoroether group, wherein 'm' and 'o' may each be independently zero or an integer ≥1; and R' and R" are each independently functionally substituted aliphatic, alkyl, phosphate or phosphonate containing groups. In some aspects, the fluoropolymer backbone ('$R_f$') according to Formula I and Formula II is a perfluoropolyether. In some aspects, the fluoropolymer backbone ('$R_f$') according to Formula I and Formula II may have a number average molecular weight ($M_n$) from about 100 g/mol to 5,000 g/mol, including each integer within the specified range. In some aspects, the functionally substituted perfluoropolyether (i.e., $R_f—X_o—R'$ or $R''—X_m—R_f—X_o—R'$) according to Formula I and Formula II may have a $M_n$ from about 150 g/mol to 5,000 g/mol, including each integer within the specified range.

In some embodiments, the functionally substituted fluoropolymers described herein comprise compounds of Formula III and Formula IV:

$$R_f—X_o—R'—(X_t—R_a)_q \qquad (III)$$

$$(R_b—X_s)_p—R''—X_m—R_f—X_o—R'—(X_t—R_a)_q \qquad (IV)$$

wherein:

$R_f$ is a fluoropolymer (e.g., a perfluoropolyether) backbone;

X is an alkyl, fluoroalkyl, ether, or fluoroether group, wherein 's,' 'm', 'o', and 't' may each be independently zero or an integer ≥1; and R' and R", and $R_a$ and $R_b$ are each independently functionally substituted aliphatic, alkyl, phosphate or phosphonate containing groups, wherein 'p' and 'q' may each be an integer ≥1. In some aspects, the fluoropolymer backbone ('$R_f$') according to Formula III and Formula IV is a perfluoropolyether. In some aspects, the fluoropolymer backbone ('$R_f$') according to Formula III and Formula IV may have a number average molecular weight ($M_n$) from about 100 g/mol to 5,000 g/mol, including each integer within the specified range. In some aspects, the functionally substituted perfluoropolyether (i.e., $R_f—X_o—R'—(X_t—R_a)_q$ or $(R_b—X_s)_p—R''—X_m—R_f—X_o—R'—(X_t—R_a)_q$ according to Formula III and Formula IV may have a $M_n$ from about 200 g/mol to 5,000 g/mol, including each integer within the specified range.

The perfluoropolyether backbone '$R_f$' comprises at least one or more repeating perfluorinated ether units distributed in any order along a polymer chain comprising: —(CF$_2$CF(CF$_3$)O)—, —(CF(CF$_3$)CF$_2$O)—, —CF(CF$_3$)O—, —(CF$_2$O)—, or —(CF$_2$CF$_2$O)—, wherein the sum of the molecular weights of the perfluorinated ether units has a number average molecular weight from about 100 g/mol to 5,000 g/mol. The repeating perfluorinated ether units may be the same or different units. For example, a repeating unit may be the same (e.g., —CF(CF$_3$)O—, —(CF$_2$O)—) or different (e.g., —CF(CF$_3$)O—, —(CF$_2$O)—).

In some embodiments, perfluoropolyether backbone ($R_f$ of formulas I-IV) described herein comprise an exemplary and non-limiting perfluoropolyether backbone of Formulas V and VI:

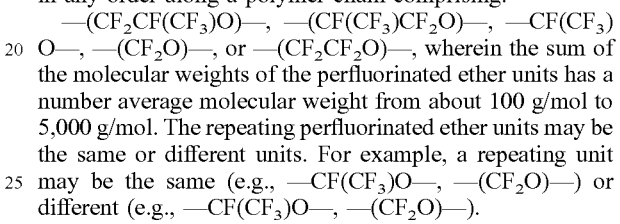

wherein:

'a', 'b', 'c', or 'd' can each independently be zero or an integer ≥1 with the proviso that at least one of 'a', 'b', 'c', or 'd' is an integer ≥1; wherein the number average molecular weight is from about 150 g/mol to about 5,000 g/mol;

T' is selected from the group consisting of CF$_2$, CF(CF$_3$), CF$_2$X, wherein X is selected from the group consisting of: (CF$_2$)$_n$CF$_3$, CH$_2$, (CH$_2$)$_n$O, and O, wherein 'n' is zero or an integer ≥1; and T" is selected from the group consisting of: F, CH$_2$CF$_2$O, CF$_3$(CF$_2$)$_n$, CF$_3$(CF$_2$)$_n$O, CF(CF$_3$), (CH$_2$)$_n$, (CH$_2$)$_n$O, and O, wherein is 'n' is zero or an integer ≥1.

A linear fluoropolymer backbone (e.g., '$R_f$' a perfluoropolyether backbone of Formulas I-IV or Formulas V and VI) as described herein comprises at least two carbon atoms. In one aspect, the linear fluoropolymer backbone may comprise between 2 and 100 carbon atoms, including each integer within the specified range. In another aspect, the linear fluoropolymer backbone may comprise between 2 and 50 carbon atoms, including each integer within the specified range. In another aspect, the linear fluoropolymer backbone comprises between 2 and 20 carbon atoms, including each integer within the specified range. In another aspect, the linear fluoropolymer backbone comprises between 2 and 10 carbon atoms, including each integer within the specified range. In another aspect, the linear fluoropolymer backbone comprises between 2 and 5 carbon atoms, including each integer within the specified range. In another aspect, the linear fluoropolymer backbone comprises 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 or more carbon atoms.

In some embodiments, one or more repeating units of the main linear fluoropolymer backbone (e.g., '$R_f$' a perfluoropolyether backbone of Formulas I-IV or Formulas V and VI) may be further substituted with one or more branching fluorocarbon or fluoroether moieties to form a fluorinated branched chain stemming from one or more carbons of the main fluoropolymer backbone. In one aspect, the one or more branched fluorinated chains stemming independently from one or more carbon atoms of the linear fluoropolymer backbone may comprise between 1 and 5 carbon atoms, including each integer within the specified range. In another aspect, the one or more branched fluorinated chains stemming independently from one or more carbon atoms of the linear fluoropolymer backbone may comprise between 1 and 3 carbon atoms, including each integer within the specified range. In another aspect, the one or more branched fluorinated chains stemming independently from one or more carbon atoms of the linear fluoropolymer backbone may comprise 1 carbon atom.

In some embodiments described herein, the functionalized fluoropolymer (i.e., the perfluoropolyether backbone '$R_f$' covalently attached to one or more groups as defined in Formulas I-IV) may have a number average molecular weight ($M_n$) of about 150 g/mol to about 5,000 g/mol, including each integer within the specified range. In some aspects, the functionalized fluoropolymer may have a number average molecular weight of about 150 g/mol to about 2,000 g/mol, including each integer within the specified range. In some aspects, the functionalized fluoropolymer may have a number average molecular weight of about 150 g/mol to about 1,500 g/mol, including each integer within the specified range. In some aspects, the functionalized fluoropolymer may have a number average molecular weight of about 150 g/mol to about 1,000 g/mol, including each integer within the specified range. In some aspects, the functionalized fluoropolymer may have a number average molecular weight of about 150 g/mol to about 500 g/mol, including each integer within the specified range. In some aspects, the functionalized fluoropolymer may have a number average molecular weight of about 150 g/mol to about 300 g/mol, including each integer within the specified range. In some aspects, the functionalized fluoropolymer may have a number average molecular weight of at least about 150 g/mol, at least about 200 g/mol, at least about 250 g/mol, at least about 300 g/mol, at least about 350 g/mol, at least about 400 g/mol, at least about 450 g/mol, at least about 500 g/mol, at least about 550 g/mol, at least about 600 g/mol, at least about 650 g/mol, at least about 700 g/mol, at least about 750 g/mol, at least about 800 g/mol, at least about 850 g/mol, at least about 900 g/mol, at least about 950 g/mol, at least about 1,000 g/mol, at least about 1,100 g/mol, at least about 1,200 g/mol, at least about 1,300 g/mol, at least about 1,400 g/mol, at least about 1,500 g/mol, at least about 1,600 g/mol, at least about 1,700 g/mol, at least about 1,800 g/mol, at least about 1,900 g/mol, at least about 2,000 g/mol, at least about 2,250 g/mol, at least about 2,500 g/mol, at least about 2,750 g/mol, at least about 3,000 g/mol, at least about 3,250 g/mol, at least about 3,500 g/mol, at least about 3,750 g/mol, at least about 4,000 g/mol, at least about 4,250 g/mol, at least about 4,500 g/mol, at least about 4,750 g/mol, or at least about 5,000 g/mol.

In some embodiments described herein, the functionalized fluoropolymer (i.e., the perfluoropolyether backbone '$R_f$' covalently attached to one or more groups as defined in Formulas I-IV) may have a weight average molecular weight ($M_w$) of about 150 g/mol to about 5,000 g/mol, including each integer within the specified range. In some aspects, the functionalized fluoropolymer may have a weight average molecular weight of about 150 g/mol to about 2,000 g/mol, including each integer within the specified range. In some aspects, the functionalized fluoropolymer may have a weight average molecular weight of about 150 g/mol to about 1,500 g/mol, including each integer within the specified range. In some aspects, the functionalized fluoropolymer may have a weight average molecular weight of about 150 g/mol to about 1,000 g/mol, including each integer within the specified range. In some aspects, the functionalized fluoropolymer may have a weight average molecular weight of about 150 g/mol to about 500 g/mol, including each integer within the specified range. In some aspects, the functionalized fluoropolymer may have a weight average molecular weight of about 150 g/mol to about 300 g/mol, including each integer within the specified range. In some aspects, the functionalized fluoropolymer may have a weight average molecular weight of at least about 150 g/mol, at least about 200 g/mol, at least about 250 g/mol, at least about 300 g/mol, at least about 350 g/mol, at least about 400 g/mol, at least about 450 g/mol, at least about 500 g/mol, at least about 550 g/mol, at least about 600 g/mol, at least about 650 g/mol, at least about 700 g/mol, at least about 750 g/mol, at least about 800 g/mol, at least about 850 g/mol, at least about 900 g/mol, at least about 950 g/mol, at least about 1,000 g/mol, at least about 1,100 g/mol, at least about 1,200 g/mol, at least about 1,300 g/mol, at least about 1,400 g/mol, at least about 1,500 g/mol, at least about 1,600 g/mol, at least about 1,700 g/mol, at least about 1,800 g/mol, at least about 1,900 g/mol, at least about 2,000 g/mol, at least about 2,250 g/mol, at least about 2,500 g/mol, at least about 2,750 g/mol, at least about 3,000 g/mol, at least about 3,250 g/mol, at least about 3,500 g/mol, at least about 3,750 g/mol, at least about 4,000 g/mol, at least about 4,250 g/mol, at least about 4,500 g/mol, at least about 4,750 g/mol, at least about 5,000 g/mol, at least about 5,500 g/mol, at least about 6,000 g/mol, at least about 6,500 g/mol, at least about 7,000 g/mol, at least about 7,500 g/mol, at least about 8,000 g/mol, at least about 8,500 g/mol, at least about 9,000 g/mol, at least about 9,500 g/mol, or at least about 10,000 g/mol.

In some embodiments described herein, the functionalized fluoropolymer (i.e., the perfluoropolyether backbone '$R_f$' covalently attached to one or more groups as defined in Formulas I-IV) may have a polydispersity index (PDI) of about 1 to about 20. In some aspects, the functionalized fluoropolymer may have a polydispersity index of about 1 to about 10. In some aspects, the functionalized fluoropolymer may have a polydispersity index of about 1 to about 5. In some aspects, the functionalized fluoropolymer may have a polydispersity index of about 1 to about 2. In some aspects, the functionalized fluoropolymer may have a polydispersity index of about 1 to about 1.5. In some aspects, the functionalized fluoropolymer may have a polydispersity index of about 1 to about 1.25. In some aspects, the functionalized fluoropolymer may have a polydispersity index of about 1 to about 1.1. In some aspects, the functionalized fluoropolymer may have a polydispersity index of about 1, less than about 1.05, less than about 1.1, less than about 1.15, less than about 1.2, less than about 1.25, less than about 1.5, less than about 1.75, less than about 2, less than about 2.25, less than about 2.5, less than about 2.75, less than about 3, less than about 3.5, less than about 4, less than about 4.5, less than about 5, less than about 6, less than about 7, less than about 8, less than about 9, less than about 10, less than about 11, less than about 12, less than about 13, less than about 14, less than about 15, less than about 16, less than about 17, less than about 18, less than about 19, or less than about 20.

In some embodiments, the fluoropolymers described herein (e.g., a functionalized perfluoropolyether) may comprise one or more phosphate, or phosphonate, containing groups. In some embodiments, these groups may comprise any one of or a combination of any one of the moieties represented by structures S1-S3. In some embodiments, these groups may be selected from the group consisting of the moieties represented by structures S1-S3. In some aspects, Y' and Y" represent an additional aliphatic, alkyl, aromatic, haloalkyl, heterocyclic, phosphate, phosphonate containing groups as given in Formulas I-IV above. In some aspects, the moieties represented by these structures are covalently attached to the fluoropolymer backbone as indicated by Formulas I-IV above.

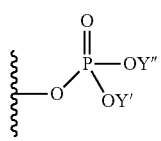

S1

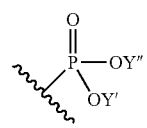

S2

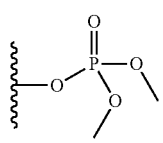

S3

In some embodiments described herein, the fluoropolymers described herein (e.g., a functionalized perfluoropolyether) may comprise between 1 and 10 of any one of or a combination of any one of the moieties represented by structures S1-S3, including each integer within the specified range. In some aspects, these structures are covalently attached to the perfluoropolyether backbone as indicated by Formulas I-IV above. In some other aspects, the fluoropolymers described herein (e.g., a functionalized perfluoropolyether) may comprise at least 1, at least 2, at least 3, or at least 4 or more of any one of or a combination of any one of structures S1-S3 covalently attached to the fluoropolymer backbone as indicated by Formulas I-IV above.

Another embodiment, described herein is a functionalized PFPE comprising a phosphate group according to structures S4-S11.

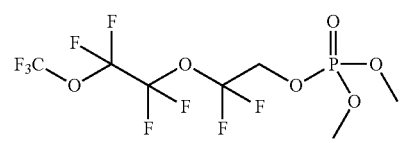

S4

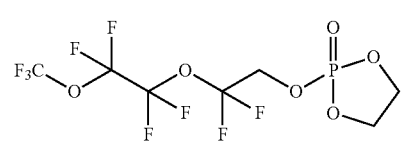

S5

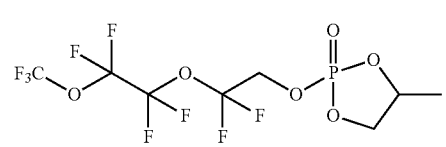

S6

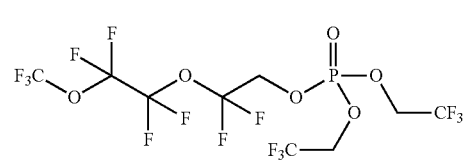

S7

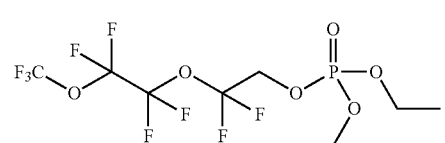

S8

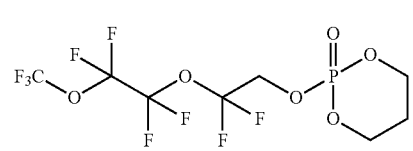

S9

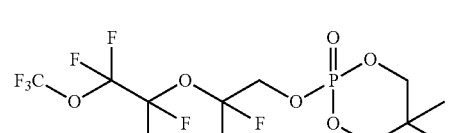

S10

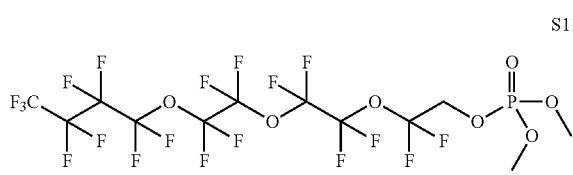

S11

Another embodiment, described herein is a functionalized PFPE comprising one phosphate structure with a branched PFPE backbone according to structure S12.

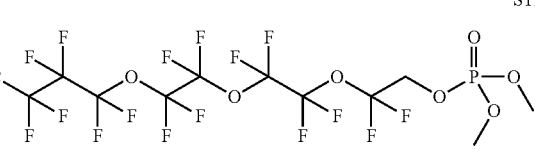

S12

Another embodiment, described herein is a functionalized PFPE comprising two phosphate structures according to structures S13.

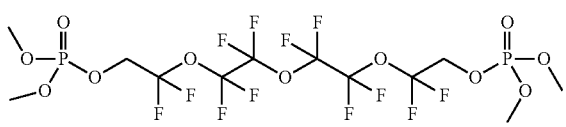

S13

In some embodiments described herein, the fluoropolymers described herein (e.g., a functionalized perfluoropolyether) may comprise any one or more of the structures selected from the group consisting of structures S14-S15 shown below, wherein X is an alkyl, fluoroalkyl, ether, or fluoroether group as defined in Formulas I-IV and Y' and Y" are any alkyl fluoroalkyl, ether, or fluoroether containing group. In some aspects, Y' and Y" may be part of a ring structure as exemplified by structures S9 and S10.

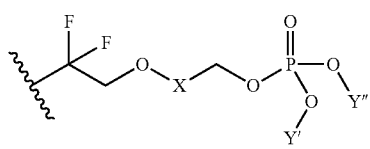

S14

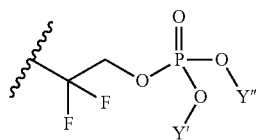

S15

According to various embodiments, the functionally substituted PFPEs described herein do not include carbon-carbon double or triple bonds, with carbon-carbon single bonds having greater stability as may be desirable for an electrolyte solvent.

In some embodiments described herein, the functionally substituted PFPEs described herein serve to coordinate alkali metal ions and exhibit chemical and thermal stability. The relative high fluorine content reduces or prevents the likelihood of combustion. Further, in some embodiments, the functionally substituted PFPEs coordinate alkali metal ions, allowing for the dissolution of salts, and the conduction of ions in electrolyte mixtures as further described herein. In some aspects, the use of an ether linkage between the PFPE backbone and any one or more of a phosphate or phosphonate containing group as shown by Formulas I-IV or any one or more of structures S4-S13 allows for increased flexibility and conformational freedom of these groups. In some aspects, this increased flexibility may enhance the functionalized perfluoropolyether mediated coordination of alkali metal ions as further described herein.

Flammability of an electrolyte compound or mixture thereof may be characterized by flash points (FPs) or self-extinguishing times (SETs). The flash point of a liquid is the lowest temperature at which vapors of the fluid ignite and is measured by subjecting the liquid to an ignition source as temperature is raised. The flash point may be tested by using an instrument, such as the Koehler rapid flash tester, or an equivalent, wherein a composition is subjected to an ignition source for at least about 1 second to about 30 seconds at a temperature range of from about −30° C. to about 300° C. A liquid that does not ignite at any temperature does not have a flash point. It is understood that references to a liquid having a flash point above a certain temperature include liquids that do not have a flash point. The SET of a sample is the time that an ignited sample keeps burning. In some cases, a liquid may have a flash point but a SET of zero, indicating that the material flashes but does not sustain a flame once the ignition source is removed.

Flammability may also be characterized by a wick test in which a wick soaked in the electrolyte compound or mixture and ignited with a Bunsen burner for at least 5 seconds. If there is no ignition, the flame is reapplied for at least 10 seconds. The speed at which the flame propagates is measured. The test may be performed with the wick in a horizontal or vertical position.

Heavily fluorinated compounds are inherently non-flammable. This is distinct from conventional electrolyte flame retardant additives such as phosphates, which retard combustion by scavenging free radicals, thereby terminating radical chain reactions of gas-phase combustion.

In some aspects, the functionally substituted fluoropolymer or fluoropolymer backbone $R_f$ that is covalently attached to one or more groups as described in Formulas I-IV is relatively small, with the size characterized by one or more of molar mass, $M_n$, $M_w$, or main chain length. In some aspects, a functionalized PFPE as described in Formulas I-VI has $R_f$ such that the functionalized PFPE is conductive and inherently non-flammable or has low flammability, as measured by a high or non-existent flash point and a SET of zero. Conductivity of some functionally substituted PFPE's drops sharply as the $R_f$ size increases, however, if $R_f$ (and the F:H ratio) is too small, the compound may be flammable. PFPEs having $R_f$ in the ranges as described below were found to have low or no flammability, and good conductivity.

In some aspects, a perfluoropolyether backbone $R_f$ covalently attached to one or more groups as described in Formulas I-IV has a molar mass or number average molecular weight of between about 150 g/mol to 500 g/mol. In some aspects, a perfluoropolyether backbone $R_f$ covalently attached to one or more groups as described in Formulas I-IV has a molar mass or number average molecular weight of between about 200 g/mol to 500 g/mol. In some aspects, a perfluoropolyether backbone $R_f$ covalently attached to one or more groups as described in Formulas I-IV has a molar mass or number average molecular weight of between about 200 g/mol to about 400 g/mol, including each integer within the specified range.

In some aspects, a perfluoropolyether backbone $R_f$ covalently attached to one or more groups as described in Formulas I-IV comprises one or more perfluorinated ether units distributed in any order along a polymer chain comprising: —(CF$_2$CF(CF$_3$)O)—, —(CF(CF$_3$)CF$_2$O)—, —CF(CF$_3$)O—, —(CF$_2$O)—, or —(CF$_2$CF$_2$O)—, wherein the sum of the molar masses or molecular weights of the perfluorinated ether units has a molar mass or number average molecular weight from about 100 g/mol to 450 g/mol, including each integer within the specified range. In some aspects, the sum of the molar masses or molecular weights of the perfluorinated ether units has a molar mass or number average molecular weight from about 100 g/mol to 400 g/mol, including each integer within the specified range. In some aspects, the sum of the molar masses or molecular weights of the perfluorinated ether units has a molar mass or number average molecular weight from about 100 g/mol to 350 g/mol including each integer within the specified range. In some aspects, the sum of the molar masses or molecular weights of the perfluorinated ether units has a molar mass or number average molecular weight from about 100 g/mol to 300 g/mol, including each integer within the specified range.

In some embodiments, $R_f$ includes a linear fluoropolymer backbone (e.g., a PFPE backbone) having between 3 and 9 carbon atoms including each integer in the specified range. For example, the linear fluoropolymer backbone may have between 3 and 8 carbon atoms, or between 3 and 7 carbon atoms, or between 3 and 6 carbon atoms, or between 3 and 5 atoms. In another aspect the linear fluoropolymer backbone comprises 3, 4, 5, 6, 7, 8, or 9 carbon atoms. If branched, the linear fluoropolymer may additionally incorporate one or more branched fluorinated chains stemming independently from one or more carbon atoms of the linear fluoropolymer backbone as described above, each of which branched chains may have between 1 and 5 carbon atoms, including each integer within the specified range.

In some embodiments, a PFPE backbone $R_f$ covalently attached to one or more groups as described in Formulas I-IV is unbranched, or if branched, has no branch points within two molecules (along the $R_f$—X—R' or R'''—$X_m$—$R_f$—X—R' chain) of the functional group on R' or R'' of Formulas I and II. In some embodiments, a branched PFPE backbone $R_f$ has no branch points within three molecules, four molecules, five molecules, or six molecules of the functional group on R' or R'' of Formulas I and II.

In some embodiments, R' and R'' as disclosed in Formulas I and II have a lower alkyl end group, e.g., R' or R'' may be methyl phosphate, ethyl phosphate, etc. In some embodiments, R' and R'' as disclosed in Formulas I and II are non-fluorinated. Fluorine is electron withdrawing such that the presence of fluorine on R' or R'' can reduce conductivity. Further, fluorine close to the carbonate may be unstable. If R' or R'' is partially fluorinated, any F may be at least two or three molecules away from the carbonate or other functional group of R' or R''.

In some embodiments, the functionally substituted fluoropolymers disclosed herein are mono-functional. It has been found that for some embodiments of relatively small molecular weight functionally substituted fluoropolymers, mono-functional functionally substituted fluoropolymers may have significantly higher conductivities than their di-functional counterparts, despite having fewer ion coordinating groups. Without being bound by a particular theory, it is believed that the increase in conductivity is due to the sharp decrease in viscosity observed for the mono-functional fluoropolymers. For relatively large functionally substituted fluoropolymers (e.g., MW of 1000 g/mol and above), the difference between mono-functional and di-functional functionally substituted fluoropolymers is not expected to be as significant.

In some embodiments, the functionally substituted fluoropolymers according to Formula (I) comprise compounds of Formula (VII):

R' is a lower alkyl linear phosphate or phosphonate group, X is alkyl, fluoroalkyl, alkoxy, fluoroalkoxy, ether, or fluoroether group, and $R_f$ is a branched or unbranched linear perfluoropolyether having a $M_n$ of between 200 g/mol and 550 g/mol.

In some embodiments, R' of Formula VII is a non-fluorinated lower alkyl linear phosphate or phosphonate group. In some embodiments, R' is an unsubstituted lower alkyl linear phosphate or phosphonate group. In some embodiments, R' is an unbranched lower alkyl linear phosphate or phosphonate group. In some embodiments, R' is ethyl phosphate or phosphonate or methyl phosphate or phosphonate.

In some embodiments, X is a non-fluorinated alkyl, alkoxy, or ether group. In some embodiments, X is an unsubstituted alkyl, alkoxy, or ether group. In some embodiments, X is an unsubstituted alkyl, alkoxy, or ether group having between 1 and 3 carbon atoms. In some embodiments, X is an unsubstituted alkyl, group having between 1 and 3 carbon atoms. In some embodiments X is $CH_2$, $CH_2CH_2$, $CH_2O$, or $CH_2CH_2O$. In some embodiments, X is $CH_2$.

In some embodiments, $R_f$ has between 3 and 9 carbon atoms. In some embodiments, $R_f$ has between 3 and 9 carbon atoms, or between 3 and 8 carbon atoms, or between 3 and 7 carbon atoms, or between 3 and 6 carbon atoms, or between 3 and 5 carbon atoms.

In some embodiments, $R_f$ has a $M_n$ of between 200 g/mol and 500 g/mol. In some embodiments, $R_f$ has a $M_n$ of between 200 g/mol and 450 g/mol. In some embodiments, $R_f$ has a $M_n$ of between 200 g/mol and 400 g/mol. In some embodiments, $R_f$ has a $M_n$ of between 200 g/mol and 350 g/mol. In some embodiments, $R_f$ has a $M_n$ of between 200 g/mol and 300 g/mol.

In some embodiments, a compound of Formula VII has a $M_n$ of between 250 g/mol and 650 g/mol. In some embodiments, a compound of Formula VII has a $M_n$ of between 250 g/mol and 600 g/mol. In some embodiments, a compound of Formula VIII has a $M_n$ of between 250 g/mol and 550 g/mol. In some embodiments, a compound of Formula VII has a $M_n$ of between 250 g/mol and 500 g/mol. In some embodiments, a compound of Formula VII has a $M_n$ of between 250 g/mol and 450 g/mol. In some embodiments, a compound of Formula VIII has a $M_n$ of between 250 g/mol and 400 g/mol. In some embodiments, a compound of Formula VII has a $M_n$ of between 250 g/mol and 350 g/mol.

In some embodiments, $R_f$ comprises one or more perfluorinated ether units distributed in any order along a chain comprising: —$(CF_2CF(CF_3)O)$—, —$(CF(CF_3)CF_2O)$—, —$CF(CF_3)O$—, —$(CF_2O)$—, or —$(CF_2CF_2O)$—. In some embodiments, $R_f$ is terminated with a $CF_2CF_2CF_2CF_3$ group or a $CF_3$ group.

The functionally substituted fluoropolymers according to Formula VII may have the following characteristics: low viscosity, non-flammability, accessible functional groups to dissociate and coordinate alkali metal salts, and relatively high ionic conductivity. In some embodiments, the viscosity is less than about 20 cP at 20° C. and 1 atm, or less than about 10 cP at 20° C. and 1 atm.

In some embodiments, the conductivity of a functionally substituted fluoropolymer according to Formula VII in 1.0M LiTFSI is at least 0.02 mS/cm at 25° C., at least 0.05 mS/cm at 25° C., at least 0.1 mS/cm at 25° C., at least 0.15 mS/cm at 25° C., at least 0.2 mS/cm at 25° C., at least 0.25 mS/cm at 25° C., at least 0.30 mS/cm at 25° C., or at least 0.35 mS/cm at 25° C.

In some embodiments, R' is an unsubstituted linear phosphate or phosphonate group, which may contribute to high conductivity, with the relatively low molecular weights of the PFPE's of Formula VII also contributing to relatively high conductivity. In some embodiments, a lack of large groups on either side of the functional group of R' of Formula VII may contribute to relatively high conductivity. In some embodiments, relatively small $R_f$ groups may contribute to relatively high conductivity.

In some embodiments, the substituted fluoropolymers according to Formula VII have a flash point and SET of zero in addition to having the viscosities and/or conductivities described above.

Any of the perfluoropolymers disclosed above with respect to Formulas I-VII may be modified to form partially fluorinated fluoropolymers. For example, one or more $CF_3$ or $CF_2$ groups of the PFPE's disclosed herein may be modified to form $CHF_2$, $CH_2F$, CHF, or $CH_2$, with the distribution of hydrogen along the $R_f$ chain managed to avoid flammability. Such partially fluorinated fluoropolymers may be formed from the PFPE or by any other known synthetic route.

Electrolyte Compositions

Some embodiments described herein are electrolyte compositions comprising a functionally substituted fluoropolymer as described herein. In some aspects, the electrolyte composition comprises a mixture or combination of functionally substituted fluoropolymers described herein. In some aspects, the electrolyte composition is useful in an alkali-metal ion battery. In some aspects, the addition of electrolyte additives may improve battery performance, facilitate the generation of a solid electrolyte interface (i.e., an SEI) on electrode surfaces (e.g., on a graphite based anode), enhance thermal stability, protect cathodes from dissolution and overcharging, and enhance ionic conductivity.

In some embodiments, the electrolyte compositions described herein comprise an alkali metal salt and a functional end group substituted PFPE as described herein. In some aspects, the electrolyte composition may optionally further comprise one or more conductivity enhancing additives, one or more SEI additives, one or more viscosity reducers, one or more high voltage stabilizers, and one or more wettability additives. In some aspects, the electrolyte compositions described herein comprise the composition shown in Table 1.

thereof with an alkali metal ion salt, and optionally other ingredients, as described below, in accordance with known techniques. In the alternative, electrolyte compositions can be prepared by including some or all of the composition ingredients in combination with the reactants for the preparation of the fluoropolymer prior to reacting the same.

When other ingredients are included in the homogeneous solvent system, in general, the functionally substituted fluoropolymer (e.g., a functionalized perfluoropolyether) is included in the solvent system in a weight ratio to all other ingredients (e.g., polyether, polyether carbonates) of from 40:60, 50:50, 60:40, or 70:30, up to 90:10, 95:5, or 99:1, or more.

In some embodiments, the electrolyte compositions comprise an SEI additive. In some aspects, the addition of SEI additives prevents the reduction of the PFPE electrolytes described herein and increases the full cycling of batteries. In some aspects, films of SEI additives may be coated onto graphite surfaces prior to any cycling to form an insoluble preliminary film. In some aspects, SEI additives form films on graphite surfaces during the first initial charging when the electrolyte compositions described herein are used in a battery. Suitable SEI additives comprise polymerizable monomers, and reduction-type additives.

Non-limiting examples include allyl ethyl carbonate, vinyl acetate, divinyl adipate, acrylic acid nitrile, 2-vinyl pyridine, maleic anhydride, methyl cinnamate, phosphonate, 2-cyanofuran, or additional vinyl-silane-based compounds or a mixture or combination thereof. In addition, sulfur-based reductive type additives may be used including sulfur dioxide, poly sulfide containing compounds, or cyclic alkyl sulfites (e.g., ethylene sulfite, propylene sulfite, and aryl sulfites). Other reductive additives including nitrates and

TABLE 1

Exemplary Fluoropolymer Electrolyte System

| Component | Exemplary Components | Composition Range (%) |
|---|---|---|
| Alkali-metal salt | Lithium salt (e.g., $LiPF_6$ or LiTFSI), Sodium salt, Potassium salt, etc. | 8-35 |
| Func. Subst. PFPE | PFPE-phosphate e.g., PFPE-methyl phosphate | 10-85 |
| Conductivity enhancing additive(s) | Ethylene carbonate, fluoroethylene carbonate, trispentafluorophenyl borane, lithium bis(oxalato)borate, γ-butyrolactone, etc. | 1-40 |
| Opt. SEI additive(s) | Ethylene carbonate, vinyl carbonate, vinyl ethylene carbonate, lithium bis(oxalato)borate, lithium difluoro(oxalate)borate, fluoroethylene carbonate, etc. | 0.5-6 |
| Opt. Viscosity reducer(s) | Perfluorotetraglyme, γ-butyrolactone, trimethylphosphate, dimethyl methylphosphonate, difluoromethylacetate, fluoroethylene carbonate (FEC), vinylene carbonate (VC), etc. | 0.5-6 |
| Opt. High voltage stabilizer(s) | 3-hexylthiophene, adiponitrile, sulfolane, lithium bis(oxalato)borate, γ-butyrolactone, 1,1,2,2-tetrafluoro-3-(1,1,2,2-tetrafluoroethoxy)-propane, ethyl methyl sulfone, trimethylboroxine, etc. | 0.5-6 |
| Opt. Wettability additive | Non-ionic or ionic surfactant, fluorosurfactant, etc. | 0.5-6 |
| Opt. Flame retardant | Trimethylphosphate, triethylphosphate, Triphenyl phosphate, etc. | 0.5-20 |

Electrolyte compositions described herein can be prepared by any suitable technique, such as mixing a functionally substituted fluoropolymer (e.g., a functionalized perfluoropolyether) as described above after polymerization nitrite containing saturated or unsaturated hydrocarbon compounds, halogenated ethylene carbonate (e.g., fluoroethylene carbonate), halogenated lactones (e.g., α-bromo-γ-butyrolactone), and methyl chloroformate. Additional examples may include a cyclic carbonate having a C=C unsaturated bond, such as vinylene carbonate (VC), dimethylvinylene carbonate (DMVC), vinylethylene carbonate (VEC), divinylethylene carbonate, phenylethylene carbonate, diphenylethylene carbonate, or any combination thereof. In addition, SEI formation may be initiated by use of carbon dioxide as a reactant with ethylene carbonate and propylene carbonate electrolytes. Additional SEI forming additives may include carboxyl phenols, aromatic esters, aromatic anhydrides (e.g., catechol carbonate), succinimides (e.g., benzyloxy carbonyloxy succinimide), aromatic isocyanate compounds, boron based compounds, such as trimethoxyboroxine, trimethylboroxin, bis(oxalato)borate (e.g., lithium bis(oxalato) borate (LiBOB)), difluoro(oxalate)borate (e.g., lithium difluoro(oxalate)borate (LiDFOB)), or tris(pentafluorophenyl) borane, or mixture or combination thereof. Further examples of SEI additives are taught by U.S. Patent App. Pub No. 2012/0082903, which is incorporated by reference herein.

In some embodiments, the electrolyte compositions comprise one or more flame retardants. Non-limiting examples of flame retardants may include trimethylphosphate (TMP), triethylphosphate (TEP), Triphenyl phosphate (TPP), trifluoroethyl dimethylphosphate, tris(trifluoroethyl)phosphate (TFP) or mixture or combination thereof. While the electrolyte solutions described herein are non-flammable, in some embodiments described herein, one or more flame retardants may be used to prevent, suppress, or delay the combustion of adjacent non-electrolyte materials (e.g., surrounding battery materials).

In some embodiments, the electrolyte compositions comprise a wetting agent. In some aspects, the wetting agent comprises an ionic or non-ionic surfactant or low-molecular weight cyclic alkyl compound (e.g., cyclohexane) or an aromatic compound. Other fluoro containing surfactants may be used. See, U.S. Pat. No. 6,960,410, which is incorporated by reference herein for its teachings thereof.

In some embodiments, the electrolyte compositions comprise a non-aqueous conductivity enhancing additive. It is thought that the presence of even small amounts of a polar conductivity enhancer aids in the disassociation of alkali metal salts and increases the total conductivity of electrolyte mixtures. This may reduce ohmic drop from a decreased bulk resistance in the electrochemical cells of batteries and enable cycling at higher densities. The conductivity enhancing additive may include, for example, one or more cyclic carbonates, acyclic carbonates, fluorocarbonates, cyclic esters, linear esters, cyclic ethers, alkyl ethers, nitriles, sulfones, sulfolanes, siloxanes, and/or sultones.

Cyclic carbonates that are suitable include ethylene carbonate (EC), propylene carbonate (PC), butylene carbonate (BC), fluoroethylene carbonate and the like. Suitable cyclic esters include, for example γ-butyrolactone (GBL), α-methyl-γ-butyrolactone, γ-valerolactone; or any combination thereof. Examples of a cyclic ester having a C=C unsaturated bond include furanone, 3-methyl-2(5H)-furanone, α-angelicalactone, or any combinations thereof. Cyclic ethers include tetrahydrofuran, 2-methyltetrahydrofuran, tetrahydropyran and the like. Alkyl ethers include dimethoxyethane, diethoxyethane and the like. Nitriles include mononitriles, such as acetonitrile and propionitrile, dinitriles such as glutaronitrile, and their derivatives. Sulfones include symmetric sulfones such as dimethyl sulfone, diethyl sulfone and the like, asymmetric sulfones such as ethyl methyl sulfone, propyl methyl sulfone and the like, and derivatives of such sulfones, especially fluorinated derivatives thereof. Sulfolanes include tetramethylene sulfolane and the like.

Other conductivity enhancing carbonates, which may be used, include fluorine containing carbonates, including difluoroethylene carbonate (DFEC), bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, or any combination thereof.

Other conductivity enhancing additives, which may be used, include fluorinated oligomers, dimethoxyethane, triethylene glycol dimethyl ether (i.e., triglyme), tetraethyleneglycol, dimethyl ether (DME), polyethylene glycols, bromo γ-butyrolactone, fluoro γ-butyrolactone, chloroethylene carbonate, ethylene sulfite, propylene sulfite, phenylvinylene carbonate, catechol carbonate, vinyl acetate, dimethyl sulfite, tetraglyme, a crown ether, or any combination thereof.

In some embodiments, the electrolyte composition comprises one or more alkali metal ion salts. Alkali metal ion salts that can be used in the embodiments described herein are also known or will be apparent to those skilled in the art. Any suitable salt can be used, including lithium salts and sodium salts, and potassium salts, that is, salts containing lithium or sodium or potassium as a cation with a suitable anion. Any suitable anion may be used, examples of which include, but are not limited to, boron tetrafluoride, (oxalate) borate, difluoro(oxalate)borate, phosphorus hexafluoride, alkylsulfonate, fluoroalkylsulfonate, arylsulfonate, bis(alkylsulfonyl)amide, perchlorate, bis(fluoroalkylsulfonyl)amide, bis(arylsulfonyl)amide, alkyl, fluorophosphate, hexafluorophosphate, hexafluoroarsenate, (fluoroalkylsulfonyl)(fluoroalkylcarbonyl)amide, halide, nitrate, nitrite, sulfate, hydrogen sulfate, alkyl sulfate, aryl sulfate, carbonate, triflate, bicarbonate, carboxylate, phosphate, hydrogen phosphate, dihydrogen phosphate, hypochlorite, an anionic site of a cation-exchange resin, and a mixture of any two or more thereof. For further examples, see, Zhang et al., U.S. Patent Application Publication No. 2012/0082903, which is incorporated by reference herein for its teachings thereof. In some aspects, the alkali metal ion salt is a lithium salt.

In some embodiments, the electrolyte compositions described herein comprise lithium hexafluorophosphate (i.e., $LiPF_6$). The use of $LiPF_6$ in lithium ion batteries has demonstrated a balance of important properties as an electrolyte salt, particularly in alkali metal batteries. $LiPF_6$ can demonstrate high conductivity and forms stable interfaces and can function to passivate the aluminum surface of aluminum-based current collectors.

Although common and useful in many applications, the use of $LiPF_6$ may be limited in certain applications, e.g., under high temperature conditions. For example, at high temperatures (e.g., >60° C.), the hydrolysis of the $PF_6$ salt anion can occur leading to the formation of HF, which is toxic and has deleterious effects on the electrolyte solvent and the electrodes active materials. Hydrolysis of the $PF_6$ salt anion can further lead to the evolution of gaseous $PF_5$ and side reactions with ethylene carbonate to form toxic fluoroethanol derivatives. Therefore, the development of electrolyte compositions that enable the use of salts having high thermal and electrochemical stability, while retaining high levels of conductivity is needed. Accordingly, in certain embodiments, it may be useful to employ alternative salts in addition to or in replacement of $LiPF_6$.

Alkali metal sulfonimide salts are exemplary materials that can be employed for such purposes. Such materials can, in some embodiments, demonstrate sufficient safety at high temperatures, high ionic conductivity, and sufficient thermal and electrochemical stability. Such properties can, in some embodiments, render these materials suitable electrolyte salts for use in lithium ion batteries. Although not intended to be limiting, it is believed that, for example, the enhanced high temperature safety, high ionic conductivity, and enhanced thermal and electrochemical stability exhibited by one particular such salt, e.g., bis(trifluoromethanesulfonyl)imide $LiN(SO_2CF_3)_2$ (LiTFSI), is attributable to the TFSI anion, which demonstrates high thermal stability and decreased hydrolysis from stable C—F bonds.

As further described herein, stable lithium salts include any lithium salt, which exhibits low levels of hydrolysis, thermostability, high ionic conductivity, and electrochemical stability in electrolyte compositions and in the alkali metal batteries described herein.

Suitable non-limiting sulfonimide salts comprise lithium, sodium, potassium, magnesium, or calcium metal sulfonimide salts, e.g., comprising lithium bis(trifluoromethanesulfonyl)imide $LiN(SO_2CF_3)_2$ (LiTFSI), lithium bis(fluorosulfonyl)imide (LiFSI), $LiN(FSO_2)_2$, lithium trifluoromethanesulfonate $Li(CF_3)SO_3$ (LiTF), lithium (trifluoromethylsulfonyl)(nonafluorobutanesulfonyl)imide $LiN(SO_2CF_3)(SO_2C_4F_9)$, lithium (fluorosulfonyl)(nonafluorobutanesulfonyl)imide $LiN(SO_2F)(SO_2C_4F_9)$, lithium (nonafluoro butan-2-one sulfonyl)(trifluoromethylsulfonyl)imide $LiN(SO_2C_2F_4OC_2F_5)(SO_2CF_3)$, and lithium (nonafluoro butan-2-one sulfonyl)(fluorosulfonyl)imide $LiN(SO_2C_2F_4OC_2F_5)(SO_2F)$.

In some embodiments, the electrolyte compositions described herein enable the use of lithium sulfonimide salts (e.g., LiTFSI) by minimizing aluminum current collector corrosion. In some aspects, the electrolyte compositions described herein comprise LiTFSI. In some aspects, the electrolyte compositions described herein comprise a mixture of $LiPF_6$ and LiTFSI.

In some embodiments lithium sulfonamide salts (e.g., LiTFSI) may help facilitate the dissolution of highly polar conductivity enhancing additives, such as ethylene carbonate when used in combination with the perfluoropolyethers described herein. Without being bound by any theory, it is thought that lithium sulfonamide salts (e.g., LiTFSI) substantially disassociate, which increases the ionic strength of the electrolyte composition allowing for a substantial dissolution of polar compounds, such as ethylene carbonate.

In some further aspects, the use of a lithium sulfonimide salt (e.g., LiTFSI) may suppress side reactions on the electrode/electrolyte interfaces and enable the use of electrolytes at elevated temperatures greater than 60° C. leading to increased energy/power characteristics and use in high temperature applications of the alkali metal batteries described herein.

In some embodiments, the electrolyte compositions described herein comprise a viscosity reducer. Suitable, non-limiting examples of viscosity reducers include perfluorotetraglyme, γ-butyrolactone, trimethylphosphate, dimethyl methylphosphonate, difluoromethylacetate, fluoroethylene carbonate (FEC), vinylene carbonate (VC), etc.

In some embodiments, the electrolyte compositions described herein comprise a high voltage stabilizer. Suitable non-limiting examples of high voltage stabilizers include 3-hexylthiophene, adiponitrile, sulfolane, lithium bis(oxalato)borate, γ-butyrolactone, 1,1,2,2-Tetrafluoro-3-(1,1,2,2-tetrafluoroethoxy)-propane, ethyl methyl sulfone, and trimethylboroxine.

In some embodiments, additional ingredients comprising PFPEs and PEO may be included in the electrolyte compositions described herein in any suitable amount, such in a weight ratio (PFPE:PEO) range of between (on one end of the range) 40:60, 50:50, or 60:40, up to (on the other end of the range) 80:20, 90:10 or 95:5. In some aspects, the PFPE and PEO may be cross-linked. See, PCT International Application Publication No. WO2014062898, which is incorporated by reference in its entirety herein.

In some embodiments, the functionally substituted PFPEs described herein comprise about 10% to about 85% of the electrolyte compositions described herein. In some embodiments, the functionally substituted PFPEs described herein comprise about 15% to about 85% of the electrolyte compositions described herein. In some embodiments, the functionally substituted PFPEs described herein comprise about 20% to about 85% of the electrolyte compositions described herein. In some embodiments, the functionally substituted PFPEs described herein comprise about 25% to about 85% of the electrolyte compositions described herein. In some embodiments, the functionally substituted PFPEs described herein comprise about 30% to about 85% of the electrolyte compositions described herein. In some embodiments, the functionally substituted PFPEs described herein comprise about 35% to about 85% of the electrolyte compositions described herein. In some embodiments, the functionally substituted PFPEs described herein comprise about 40% to about 85% of the electrolyte compositions described herein. In some embodiments, the functionally substituted PFPEs described herein comprise about 10% to about 30% of the electrolyte compositions described herein. In some embodiments, the functionally substituted PFPEs described herein comprise about 10% to about 25% of the electrolyte compositions described herein. In some aspects, the functionally substituted PFPEs described herein comprise about 40% to about 50% of the electrolyte compositions described herein. In some aspects, the functionally substituted PFPEs described herein comprise about 50% to about 60% of the electrolyte compositions described herein. In some aspects, the functionally substituted PFPEs described herein comprise about 60% to about 70% of the electrolyte compositions described herein. In some aspects, the functionally substituted PFPEs described herein comprise about 70% to about 85% or more of the electrolyte compositions described herein. In some aspects, the functionally substituted PFPEs described herein comprise about 10%, about 15%, about 20%, about 35%, about 30%, about 35%, about 40%, about 45%, about 50%, about 55%, about 60%, about 65%, about 70%, about 75%, about 80%, about 85%, or about 90% of the electrolyte compositions described herein.

In some embodiments, the alkali-metal salts described herein comprise about 15% to about 35% of the electrolyte compositions described herein. In some aspects, the functionally substituted PFPEs described herein comprise about 20% to about 30% of the electrolyte compositions described herein. In some aspects the alkali-metal salts described herein comprise about 10%, about 15%, about 20%, about 25%, about 30%, about 35%, or about 40% of the electrolyte compositions described herein.

In some embodiments, the optional one or more conductivity enhancing additives described herein comprise about 1% to about 40% of the electrolyte compositions described herein. In some aspects, the optional one or more conductivity enhancing additives described herein comprise about 10% to about 20% of the electrolyte compositions described herein. In some aspects, the optional one or more conductivity enhancing additives described herein comprise about 20% to about 30% of the electrolyte compositions described herein. In some aspects, the optional one or more conductivity enhancing additives described herein comprise about 30% to about 40% of the electrolyte compositions described herein. In some aspects, the optional one or more conductivity enhancing additives described herein comprise about 1%, about 2%, about 3%, about 4%, about 5%, about 10%, about 15%, about 20%, about 25%, about 30%, about 35%, about 40%, or about 45% of the electrolyte compositions described herein.

In some embodiments, the optional one or more SEI additives described herein comprise about 0.5% to about 6% of the electrolyte compositions described herein. In some aspects, the optional one or more SEI additives described herein comprise about 0.5%, about 1%, about 2%, about 3%, about 4%, about 5%, or about 6% of the electrolyte compositions described herein.

In some embodiments, the optional one or more viscosity reducers described herein comprise about 0.5% to about 6% of the electrolyte compositions described herein. In some aspects, the optional one or more viscosity reducers described herein comprise about 0.5%, about 1%, about 2%, about 3%, about 4%, about 5%, or about 6% of the electrolyte compositions described herein.

In some embodiments, the optional one or more high voltage stabilizers described herein comprise about 0.5% to about 6% of the electrolyte compositions described herein. In some aspects, the optional one or more high voltage stabilizers described herein comprise about 0.5%, about 1%, about 2%, about 3%, about 4%, about 5%, or about 6% of the electrolyte compositions described herein.

In some embodiments, the optional one or more wettability additives described herein comprise about 0.5% to about 6% of the electrolyte compositions described herein. In some aspects, the optional one or more wettability additives described herein comprise about 0.5%, about 1%, about 2%, about 3%, about 4%, about 5%, or about 6% of the electrolyte compositions described herein.

In some embodiments, the electrolyte compositions described herein are non-flammable with a flash point greater than about 50° C. to about 275° C. In some aspects, the electrolyte compositions described herein are non-flammable with a flashpoint greater than about 50° C., greater than about 60° C., greater than about 70° C., greater than about 80° C., greater than about 90° C., greater than about 100° C., greater than about 110° C., greater than about 120° C., greater than about 130° C., greater than about 140° C., greater than about 150° C., greater than about 160° C., greater than about 170° C., greater than about 180° C., greater than about 190° C., greater than about 200° C., greater than about 200° C., greater than about 210° C., greater than about 220° C., greater than about 230° C., greater than about 240° C., greater than about 250° C., greater than about 260° C., greater than about 270° C., or greater than about 280° C. or greater. The flash point may be tested by using an instrument, such as the Koehler rapid flash tester, or an equivalent, wherein a composition is subjected to an ignition source for at least about 1 seconds to about 30 seconds at a temperature range of from about −30° C. to about 300° C.

Flammability of an electrolytic compound or mixture thereof may be characterized by flash points (FPs) or self-extinguishing times (SETs). The flash point of a liquid is the lowest temperature at which vapors of the fluid ignite and is measured by subjecting the liquid to an ignition source as temperature is raised. The flash point may be tested by using an instrument, such as the Koehler rapid flash tester, or an equivalent, wherein a composition is subjected to an ignition source for at least about 1 second to about 30 seconds at a temperature range of from about −30° C. to about 300° C. The SET of a sample is the time that an ignited sample keeps burning. In some cases, a liquid may have a flash point but a SET of zero, indicating that the material flashes but does not burn once the ignition source is removed.

Heavily fluorinated compounds are inherently non-flammable. This is distinct from conventional electrolyte flame retardant additives such as phosphates, which retard combustion by scavenging free radicals, thereby terminating radical chain reactions of gas-phase combustion.

As described above, in some embodiments, the electrolytes disclosed herein have a fluoropolymer or mixture of fluoropolymers as the largest component by weight. This is distinct from fluorinated additives present in small amounts with non-fluorinated hydrocarbon or other conventional solvent as the largest component of the solvent.

In some embodiments, an electrolyte solvent includes a functionally substituted PFPE as the largest component by weight and also includes a significant amount of a C1-C10 cyclo alkyl carbonate. For example, the electrolyte solvent may include at least 5% by weight, or greater than 5% by weight, of C1-C10 cyclo alkyl carbonate such as ethylene carbonate (EC), propylene carbonate and the like. In some embodiments, the electrolyte includes at least 5% of a C1-C10 or C1-C5 cycloalkyl carbonate. In some embodiments, the electrolyte includes at least 10% of a C1-C10 or C1-C5 cycloalkyl carbonate. In some embodiments, the electrolyte includes at least 15% of a C1-C10 or C1-C5 cycloalkyl carbonate. In some embodiments, the electrolyte includes at least 20% of a C1-C10 or C1-C5 cycloalkyl carbonate. In addition to being a conductivity enhancer, the cyclo alkyl carbonate may aid formation of a stable SEI layer.

In the same or other embodiments, the electrolyte solvent further comprises a non-phosphate or phosphonate-containing functionally substituted perfluoropolymer ether having one or more aliphatic, alkyl, aromatic, heterocyclo, amide, carbamate, carbonate, sulfone, or nitrile terminal end groups. Such functionally substituted fluoropolymers may take the form of Formula I or Formula II as described above, but with an aliphatic, alkyl, aromatic, heterocyclo, amide, carbamate, carbonate, sulfone, or nitrile terminal end group in place of the phosphate or phosphonate-containing groups. Further description of such functionally substituted fluoropolymers is in U.S. Provisional Patent Application No. 62/111,217, filed Feb. 3, 2015, titled "FUNCTIONALIZED FLUOROPOLYMERS," U.S. Provisional Patent Application No. 62/147,047, filed Apr. 14, 2015, also titled "FUNCTIONALIZED FLUOROPOLYMERS," both of which are incorporated herein by reference. In some embodiments, a mixture of a phosphate or phosphonate-containing functionally substituted perfluoropolymer ether and a non-phosphate or phosphonate-containing functionally substituted perfluoropolymer ether comprises at least 30% of the electrolyte solvent. In some embodiments, a mixture of a phosphate or phosphonate-containing functionally substituted perfluoropolymer ether and a non-phosphate or phosphonate-containing functionally substituted perfluoropolymer ether comprises at least 40% of the electrolyte solvent. In some embodiments, a mixture of a phosphate or phosphonate-containing functionally substituted perfluoropolymer ether and a non-phosphate or phosphonate-containing functionally substituted perfluoropolymer ether comprises at least 50% of the electrolyte solvent.

In some aspects, the electrolyte compositions described herein comprise the solvent system shown in Table 2. It should be noted that the solvent systems in Table 2 and described above do not include salts or optional SEI additives, which may be added to the solvent to form an electrolyte composition.

TABLE 2

Example Fluoropolymer Electrolyte Solvent System

| Component | Example Components | Composition Ranges (wt %) |
|---|---|---|
| PFPE-phosphate or mixture of PFPE-phosphate and other func. sub. PFPEs | PFPE-methyl phosphate | 40-100<br>50-90<br>55-85<br>60-70 |
| C1-C10 cycloalkyl carbonate or mixture thereof | Ethylene carbonate, propylene carbonate | 0-40<br>5-30<br>10-30<br>15-30 |
| Opt. Conductivity Additive(s), Opt. Viscosity reducer(s), Opt. High voltage stabilizer(s), Opt. Wettability additive(s), Opt. Flame retardants | Trispentafluorophenyl borane, lithium bis(oxalato)borate, γ-butyrolactone, perfluorotetraglyme, dimethyl methylphosphonate, difluoromethylacetate, fluoroethylene carbonate (FEC), vinylene carbonate (VC), 3-hexylthiophene, adiponitrile, sulfolane, lithium bis(oxalato) borate, γ-butyrolactone, 1,1,2,2-tetrafluoro-3-(1,1,2,2-tetrafluoroethoxy)-propane, ethyl methyl sulfone, trimethylboroxine, non-ionic or ionic surfactant, fluorosurfactant, trimethylphosphate, triethylphosphate, triphenyl phosphate, etc. | 0.5-35<br>0.5-25<br>0.5-6 |

Alkali Metal Batteries

An alkali metal battery (sometimes also referred to as alkali metal ion batteries, and including alkali metal-air batteries) of the present invention generally includes (a) an anode; (b) a cathode; (c) a liquid or solid electrolyte composition as described above operatively associated with the anode and cathode, and (d) optionally a separator for physically separating the anode and cathode (See, e.g., M. Armand and J.-M. Tarascon, Building Better Batteries, Nature 451, 652-657 (2008)). In addition, alkali metal batteries may further comprise one or more current collectors at the cathode and anode. Examples of suitable battery components include but are not limited to those described in U.S. Pat. Nos. 5,721,070; 6,413,676; 7,729,949; and 7,732,100, and in U.S. Patent Application Publication Nos. 2009/0023038; 2011/0311881; and 2012/0082930; and S.-W. Kim et al., Adv. Energy Mater. 2, 710-721 (2012), each of which is incorporated by reference herein for their teachings thereof.

Examples of suitable anodes include but are not limited to, anodes formed of lithium metal, lithium alloys, sodium metal, sodium alloys, carbonaceous materials such as graphite, titanium metals, such as, for example lithium titanium oxide (lithium titanate or LTO) and combinations thereof. Examples of suitable cathodes include, but are not limited to cathodes formed of transition metal oxides, doped transition metal oxides, metal phosphates, metal sulfides, lithium iron phosphate, and combinations thereof. See, e.g., U.S. Pat. No. 7,722,994, which is incorporated by reference herein for its teachings thereof. Additional examples include but are not limited to those described in Zhang et al., U.S. Pat. App. Pub No. 2012/0082903, at paragraphs 178 to 179, which is incorporated by reference herein for its teachings thereof. In some embodiments, an electrode such as a cathode can be a liquid electrode, such as described in Y. Lu et al., J Am. Chem. Soc. 133, 5756-5759 (2011), which is incorporated by reference herein for its teachings thereof. Numerous carbon electrode materials, including but not limited to carbon foams, fibers, flakes, nanotubes and other nanomaterials, etc., alone or as composites with each other or other materials, are known and described in, for example, U.S. Pat. Nos. 4,791,037; 5,698,341; 5,723,232; 5,776,610; 5,879,836; 6,066,413; 6,146,791; 6,503,660; 6,605,390; 7,071,406; 7,172,837; 7,465,519; 7,993,780; 8,236,446, and 8,404,384, each of which is incorporated by reference herein for its teachings thereof. In an alkali metal-air battery such as a lithium-air battery, sodium-air battery, or potassium-air battery, the cathode is preferably permeable to oxygen (e.g., where the cathode comprises mesoporous carbon, porous aluminum, etc.), and the cathode may optionally contain a metal catalyst (e.g., manganese, cobalt, ruthenium, platinum, or silver catalysts, or combinations thereof) incorporated therein to enhance the reduction reactions occurring with lithium ion and oxygen at the cathode. See, e.g., U.S. Pat. No. 8,012,633 and U.S. Patent Application Publication Nos. 2013/0029234; 2012/0295169; 2009/0239113; see also P. Hartmann et al., A rechargeable room-temperature sodium superoxide ($NaO_2$) battery, Nature Materials 12, 228-232 (2013), each of which is incorporated by reference herein for its teachings thereof.

Where the electrolyte composition is a liquid composition, a separator formed from any suitable material permeable to ionic flow can also be included to keep the anode and cathode from directly electrically contacting one another. Examples of suitable separators include, but are not limited to, porous membranes or films formed from organic polymers or polyolefin based separators, such as polypropylene, polyethylene, etc., including composites thereof. The useful separators may further have a coating, for example, a ceramic coating (e.g., a polyolefin based separator with a ceramic coating) or a PVDF coating. See, generally P. Arora and Z. Zhang, Battery Separators, Chem. Rev. 104, 4419-4462 (2004), which is incorporated by reference herein for its teachings thereof. When the electrolyte composition is a solid composition, particularly in the form of a film, it can serve as its own separator. Such solid film electrolyte compositions of the present invention may be of any suitable thickness depending upon the particular battery design, such as from 0.01, 0.02, 0.1 or 0.2 microns thick, up to 1, 5, 7, 10, 15, 20, 25, 30, 40 or 50 microns thick, or more.

The alkali metal batteries described herein may also include one or more current collectors at the cathode and one or more current collectors at the anode. Suitable current collectors function to transfer a large current output while having low resistance. Current collectors described herein may be, for example, in the form of a foil, mesh, or as an etching. Furthermore, a current collector may be in the form of a microstructured or a nanostructured material generated from one or more suitable polymers. Suitable atomic materials comprise Cu, Fe, Ni, or Ti. In some aspects, the current collectors may be aluminum (Al) at the cathode. Because lithium may react with Al at low potentials, copper (Cu) is typically used at the anode.

Aluminum-based cathodic current collectors are widely used because of their excellent conductivity, high mechanical strength, high ductility, and affordability in commercial settings. Despite these aspects, passivation of the aluminum current collectors is generally necessary to prevent corrosion and diminished cell performance. For example, the lithium salt $LiPF_6$ forms stable interfaces and leads to passivation of the aluminum surface of aluminum-based current collectors (understood to occur by partial decomposition of the lithium salt and oxidation of metallic aluminum at high potentials, forming a dense film of $AlF_3$ on the top of the air-formed surface layer of $Al_2O_3$). While, this protective layer reduces the level of corrosion, aluminum still undergoes a slow corrosion, which in certain cases can be a limiting factor in alkali metal battery performance (e.g., when 5 V class cathode materials are used). Aluminum current collector corrosion may be determined by methods known in the art, see, for example, Kramer et al., Electrochemistry Letters. 1(5) 2012 and Zhang et al., Journal of The Electrochemical Society. 152 (11) 2005, which is incorporated by reference herein for its teachings thereof.

It is well established that sulfonimide-based salts, such as LiTFSI, generally do not properly passivate aluminum-based current collectors with insoluble fluorinated species. Again, although not intending to be limited by theory, it is believed that this is likely due to the stability of the TFSI anion. This lack of passivation eventually leads to severe aluminum current collector corrosion (aluminum dissolution) at potentials higher than 3.5 V leading to decreased contact of the cathode and the aluminum current collector, electrode degradation and rapid cell fading.

Thus, it was surprisingly found that the functionalized PFPE-based solid or liquid electrolyte compositions described herein prevent or reduce the corrosion of aluminum-based current collectors in alkali metal batteries, enabling the use of highly stable lithium salts (e.g., LiTFSI). Similar to how $LiPF_6$ functions to passivate aluminum, and without being bound by any theory, it is believed that the functionalized PFPEs described herein react with aluminum and form a thin passivating film, which protects aluminum from future oxidative corrosion. Although not intended to be limiting, in some aspects, this may occur by formation of an insoluble protective $AlF_3$ layer as a result of PFPE oxidation and aluminum dissolution in the very beginning of the cell charging process. In some other aspects, this may occur by the formation of an $Al(TFSI)_3$ protective layer, which is insoluble in the PFPE based electrolyte compositions described herein.

Therefore, in some embodiments described herein, the PFPE-based solid or liquid electrolyte compositions described herein can prevent or reduce corrosion of aluminum based current collectors. In some aspects, the PFPE-based solid or liquid electrolyte compositions prevent or reduce aluminum current collector corrosion and permit the use of any stable alkali metal salt described herein, including those that do not passivate aluminum. In some aspects, the PFPE-based solid or liquid electrolyte compositions described herein comprising a lithium sulfonimide salt prevent or reduce aluminum current collector corrosion. In one aspect, the PFPE-based solid or liquid electrolyte compositions described herein comprising a LiTFSI prevent or reduce aluminum current collector corrosion.

In some embodiments, the use of a stable lithium salt as described herein (e.g., LiTFSI) in the functionalized PFPE-based solid or liquid electrolyte compositions described herein further decreases the flammability of the electrolyte composition. In some aspects, the combination of a stable lithium salt with PFPE-based electrolyte compositions as described herein further reduces the flammability of the electrolyte composition as compared to a PFPE-based electrolyte composition alone. In some aspects, the use of a stable lithium salt (e.g., LiTFSI) with a PFPE-based electrolyte composition as described herein reduces gas build up and eventual rupture or gaseous explosion risk of a susceptible alkali metal battery.

In some embodiments, the use of a stable lithium salt as described herein (e.g., LiTFSI) in the functionalized PFPE-based solid or liquid electrolyte compositions described herein in an alkali metal battery increases the potential operating temperature of the battery without incurring battery failure. In one aspect, the operating temperature may be from about −30° C. to about 150° C., including each integer within the specified range. In another aspect, the operating temperature may be from about −30° C. to about 50° C., including each integer within the specified range. In another aspect, the operating temperature may be from about 70° C. to about 200° C., including each integer within the specified range. In another aspect, the operating temperature may be from about −30° C. to about 100° C., including each integer within the specified range. In another aspect, the operating temperature may be from about −30° C. to about 150° C., including each integer within the specified range. In another aspect, the operating temperature may be from about −10° C. to about 150° C., including each integer within the specified range. In another aspect, the operating temperature may be from about 0.0° C. to about 150° C., including each integer within the specified range. In another aspect, the upper limit of the battery operating temperature may be at least about 50° C., at least about 60° C., at least about 70° C., at least about 80° C., at least about 90° C., at least about 100° C., at least about 110° C., at least about 120° C., at least about 130° C., at least about 140° C., or at least about 150° C. In another aspect, the lower limit of the battery operating temperature may be at least about −30° C., at least about −20° C., at least about −10° C., at least about 0.0° C., at least about 10° C., or at least about 20° C.

All components of the battery can be included in or packaged in a suitable rigid or flexible container with external leads or contacts for establishing an electrical connection to the anode and cathode, in accordance with known techniques.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the specified embodiments. All of the various embodiments, aspects, and options disclosed herein can be combined in all variations. The scope of the compositions, formulations, methods, and processes described herein include all actual or potential combinations of embodiments, aspects, options, examples, and preferences herein described. All patents and publications cited herein are incorporated by reference herein for the specific teachings thereof.

EXAMPLES

Example 1

Synthesis of Ether-Linked Phosphate Substituted Perfluoropolyethers

Synthesis of 1H,1H-perfluoro-3,6,9-trioxatridecanyl dimethyl phosphate (S11)

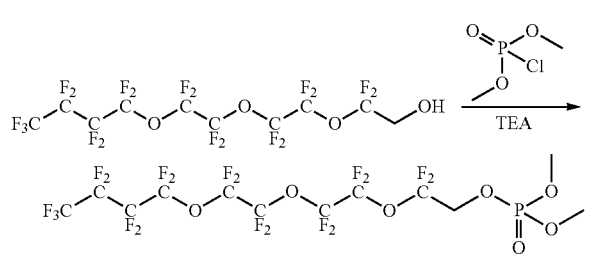

A 500 mL round bottom flask was charged with 50.0 g of 1H,1H-perfluoro-3,6,9-trioxatridecan-1-ol (0.091 mole), 13.4 mL (0.096 mole) of triethylamine, 250 ml of 1,1,1,3,3-pentafluorobutane and molecular sieves. The reaction mixture was dried overnight and subsequently transferred to a 500 mL Schlenk flask via cannula needle. The flask was equipped with a pressure equalized addition funnel, placed under nitrogen and cooled to 0° C. 13.3 mL (0.096 mole) of dimethyl chlorophosphate in 10 mL dry 1,1,1,3,3-pentafluorobutane was added dropwise, the reaction was continued at room temperature for additional 18 hours. Afterwards, the mixture was filtered, washed with 5% $HCl_{aq.}$, water and brine, then dried with anhydrous magnesium sulfate. The solvent was removed using rotary evaporator, and the product was isolated via a distillation under reduced pressure. 13.6 g (0.021 mole, 25% yield) of 1H,1H-perfluoro-3,6,9-trioxatridecanyl dimethyl phosphate was collected as a higher boiling clear, colorless fraction.

$^1$H NMR (CDCl$_3$, 400 MHz), δ (ppm): 4.36 (q, 2H, J=8.7 Hz, —O—CF$_2$CH$_2$—OP(O)(CH$_3$)$_2$), 3.82 (d, 6H, J=11.2 Hz, —O—CF$_2$CH$_2$—OP(O)(CH$_3$)$_2$)

FTIR (thin film), ν (cm$^1$): 2967, 2864 (m, C—H stretch), 1458 (w, C—H bend), 1304 (s, P=O stretch), 1213, 1186, 1117 (s, C—F and C—O stretches), 1043 (s, C—OP stretch), 953, 855 (s, P—O stretch)

Synthesis of 1H,1H-nonafluoro-3,6-dioxaheptanyl dimethyl phosphate (S4)

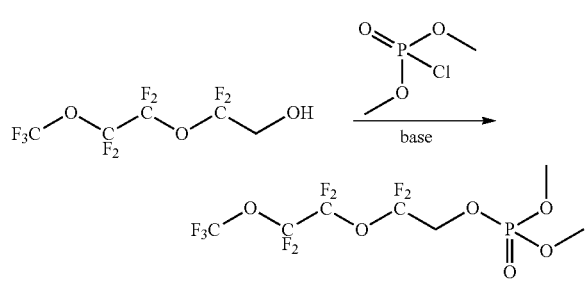

A 250 mL Schlenk flask equipped with a pressure equalized addition funnel was charged with 4.45 g (0.186 mole) of sodium hydride (or potassium tert-butoxide) and 150 mL of anhydrous THF, then placed under inert atmosphere and stirred at 0° C. 51.3 g (0.182 mole) of 1H,1H-nonafluoro-3,6-dioxaheptan-1-ol was added dropwise to the mixture over 1 hour, then stirred at room temperature for additional 20 minutes. A 500 mL three-neck, round bottom flask was charged with 20.0 mL (0.186 mole) of dimethyl chlorophosphate and 300 mL anhydrous THF. The reaction flask was flushed with nitrogen and cooled in an IPA-dry ice bath to −40 to −30° C. A pressure equalized addition funnel connected to the flask. The solution of sodium 1H,1H-nonafluoro-3,6-dioxaheptan-1-oxide was added dropwise to the reaction mixture while maintaining the temperature of the cooling bath. Upon addition, the reaction was stirred at room temperature for 1 hour. Afterwards, 5 mL of water and 100 mL 1,1,1,3,3-pentafluorobutane were injected, the mixture was filtered, and solvents were removed using rotary evaporator. 1H,1H-nonafluoro-3,6-dioxaheptanyl dimethyl phosphate was isolated via a distillation under reduced pressure, collecting 60.9 g (0.156 mole, 84% yield) clear, colorless liquid (40-45° C./0.09-0.2 Torr fraction).

$^1$H NMR (CDCl$_3$, 400 MHz), δ (ppm): 4.35 (q, 2H, J=8.4 Hz, —O—CF$_2$CH$_2$—OP(O)(CH$_3$)$_2$), 3.79 (d, 6H, J=11.3 Hz, —O—CF$_2$CH$_2$—OP(O)(CH$_3$)$_2$)

FTIR (thin film), ν (cm$^{-1}$): 2966, 2864 (m, C—H stretch), 1459 (w, C—H bend), 1273 (s, P=O stretch), 1225, 1180, 1120 (s, C—F and C—O stretches), 1036 (s, C—OP stretch), 961, 852 (s, P—O stretch)

Example 2

Physical and Safety Characteristics of Ether-Linked Phosphate Substituted Perfluoropolyethers Physical Characteristics The density, viscosity, boiling point, melting point, and flash point of a phosphate substituted perfluoropolyether according to structure S11 was determined and are shown in Table 2 below. The density of a solution of phosphate substituted perfluoropolyether was determined using standard density measurements in a 1 mL volumetric flask at room temperature.

The viscosity was measured using a Brookfield Engineering DV2TCP Cone Plate Viscometer with a 650SD Recirculating Chiller. Approximately 1 mL of sample was loaded into a syringe and introduced into the stainless steel sample cup. Rheocalc T software was used to measure viscosities from −15 to 80° C. At each temperature, the height of the spindle was adjusted to the appropriate height and torque values remained between 10 and 100% for accurate measurements.

Boiling points were determined using a TA Instruments Q100 Differential Scanning Calorimeter with RSC90 Heat Exchanger. Approximately 15 mg of material were sealed in a Tzero aluminum hermetic pan with 75 μm pin-hole lids and equilibrated at −80° C. and then heated to 400° C. at a rate of 10° C./min. The melting and boiling points were taken as the on-set temperature of the melting and boiling endotherms respectively.

Flash Points were measured according to standards set up in publication ASTM D7236 entitled Standard Test Method for Flash Point by Small Scale Closed Cup Tester (Ramp Method) using a Stanhope-Seta Setaflash Series 8 Closed Cup Flash Point Tester.

TABLE 2

Physical Characteristics of Phosphate Substituted Perfluoropolyethers; Structures S4 and S11

| | S11 | S4 |
|---|---|---|
| Density | 1.62 g/cm$^3$ | 1.52 g/cm$^3$ |
| Boiling Point | 254° C. | 212° C. |
| Flash Point | None | None |
| Viscosity at 20° C. | 17.0 cP | 6.9 cP |

Safety Characteristics

The flammability of electrolyte solutions containing a phosphate substituted perfluoropolyether according to structure S4 and different percentages of additive was determined. Flame tests were performed by soaking a 30 mm length of 3 mm diameter silica wick in 120 mg of electrolyte. The wick was then oriented vertically and the top of the wick was exposed to a flame from a butane torch for 3 seconds. Once the torch was removed, the duration of burning of the electrolyte was measured as shown in Table 3.

TABLE 3

Flammability of Electrolyte Solutions Containing Structure S4

| Additive | Additive % wt | Salt | Concentration (M) | Flashpoint ° C. | Flame Test |
|---|---|---|---|---|---|
| — | 0 | — | — | Not Tested | No Flame |
| — | 0 | LiTFSI | 1.0 | Not Tested | No Flame |
| EC | 10 | LiTFSI | 1.0 | Not Tested | No Flame |
| EC | 20 | LiTFSI | 1.0 | Not Tested | No Flame |
| EC | 30 | LiTFSI | 1.0 | Not Tested | No Flame |
| EC | 40 | LiTFSI | 1.0 | Not Tested | No Flame |
| EC | 50 | LiTFSI | 1.0 | Not Tested | <1 sec |
| EC | 100 | LiTFSI | 1.0 | 152 | 6 sec |
| GBL | 10 | LiTFSI | 1.0 | Not Tested | No Flame |
| GBL | 20 | LiTFSI | 1.0 | 132 | No Flame |
| GBL | 30 | LiTFSI | 1.0 | Not Tested | No Flame |
| GBL | 40 | LiTFSI | 1.0 | Not Tested | No Flame |
| GBL | 50 | LiTFSI | 1.0 | Not Tested | <1 sec |
| GBL | 100 | LiTFSI | 1.0 | 102 | 12 sec |

Example 3

Electrochemical Measurements

Conductivity measurements were conducted in an rhd Instruments TSC1600 Closed Cell with a Microcell HC Cell Holder equipped with a Eurotherm 3216 Temperature Controller. Approximately 1.2 mL of sample was added to the platinized cell cup, and the platinum disk was secured as the upper electrode. The cell constant was measured to be 1.06 cm-1 using several conductivity standards. The conductivity was measured using electrochemical impedance spectroscopy (EIS) performed by a Metrohm Autolab PGSTAT 204 Potentiostat with FRA module. A voltage of 10 mV was applied from a frequency of 100 kHz to 1 Hz and the low frequency minimum was used to determine the electrolyte resistance (Rb). Measurements were performed from –20 to 100° C. with at least 5 minutes for equilibration at each temperature. All experiments were performed in an argon-filled Vacuum Atmospheres Company (VAC) Omni Lab glovebox with water and oxygen at <1 ppm.

Cyclic voltammetry measurements were carried out with approximately 1 mL of solution in a CH Instruments Simple Cell Stand with either platinum (anodic scan) or glassy carbon (cathodic scan) as the working electrode, platinum as the counter electrode, and lithium metal reference electrode. The measurements were performed by a Metrohm Autolab PGSTAT 204 Potentiostat with a scan rate of 5 mV/s. The experiments were performed in an argon-filled Vacuum Atmospheres Company (VAC) Omni Lab glovebox with water and oxygen at <1 ppm.

Other methods for determining conductivity and cyclic voltammetry may be used, see also, Teran et al., Solid State Ionics (2011) 203, p. 18-21; Lascaud et al., Maromolecules (1994) 27 (25); and International Patent Application Publication Nos. WO2014/204547 and WO2014/062898, each of which are incorporated by reference herein for their teachings thereof.

Cell cycling was carried out in CR2032 coin cells with positive and negative electrode (1.26 cm$^2$) separated by a separator soaked in 100 μL of electrolyte solution. The cells were assembled in an argon-filled Vacuum Atmospheres Company (VAC) Omni Lab glovebox with water and oxygen at <1 ppm. An MTI MSK-160D Electric Coin Cell Crimping and Disassembling machine was used to crimp the cells. The cells are cycled on an Arbin BT-2043 battery tester at 25° C.

Example 4

Ionic Conductivity of Ether-Linked Phosphate Substituted Perfluoropolyether Based Electrolyte Compositions The conductivity of electrolyte solutions containing S11 (structure S11) and TrimPMe (structure S4) was determined as a function of LiTFSI salt concentration at 25° C. As shown in FIG. 1, the conductivity increases with increasing LiTFSI content and begins decreasing at salt concentrations greater than 0.6M LiTFSI.

Figure 2:
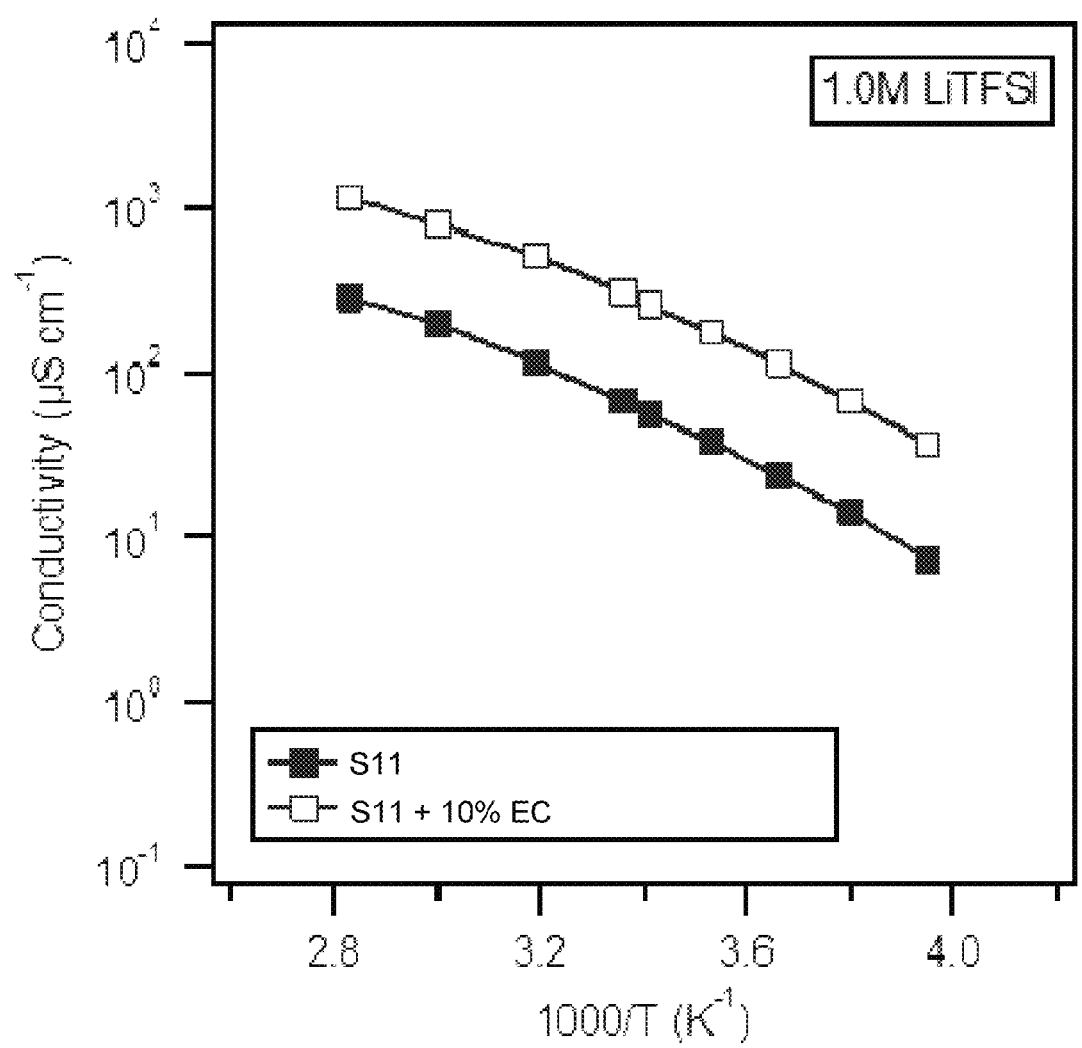

As shown in FIG. 2, the conductivity of electrolyte solutions containing S11 and 1.0M LiTFSI decreases across a range of temperatures. The addition of 10% of the conductivity enhancing additive ethylene carbonate increases the overall conductivity of the solutions. The conductivity of electrolyte solutions of S11 and different concentrations of additives is shown in Table 4.

TABLE 4

Conductivity of Electrolyte Solutions Containing Structure S11

| Solvent Composition | Salt | Concentration | Conductivity (mS/cm @ 25 C.) |
|---|---|---|---|
| S11 = 100 | LiTFSI | 1.0 | 0.067 |
| S11:EC = 90:10 | LiTFSI | 1.0 | 0.305 |
| S11:GBL:EC = 80:10:10 | LiTFSI | 0.8 | 0.771 |
| S11:GBL:EC = 80:10:10 | LiTFSI | 1.0 | 0.599 |

Figure 3:
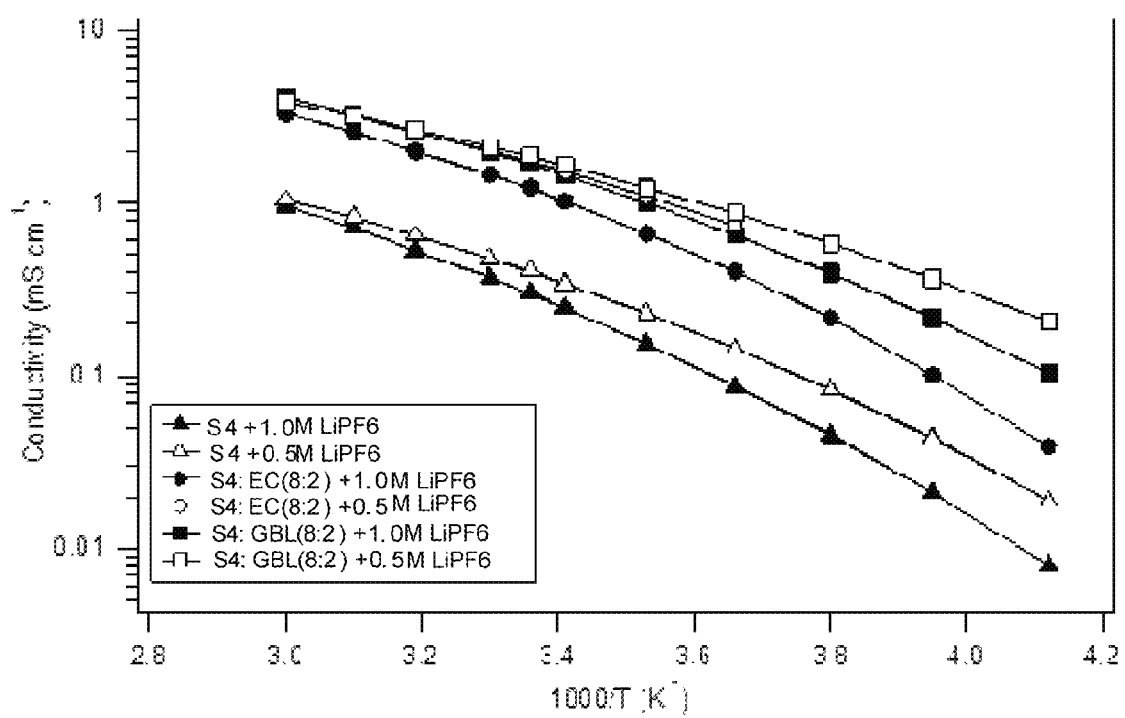
Figure 4:
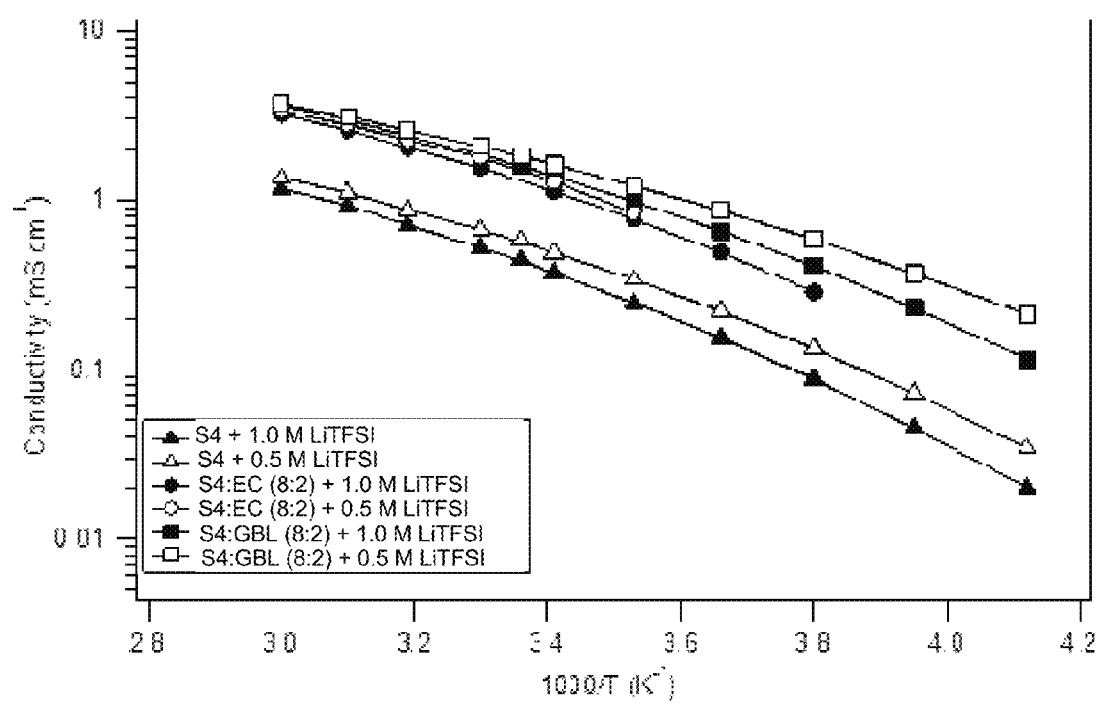

The conductivity of electrolyte solutions containing Structure S4 and different concentrations of LiPF$_6$ and the additives EC and GBL was tested across a range of temperatures. As shown in FIG. 3, the conductivity of all solutions decreases across a range of temperatures with electrolyte solutions supplemented with EC or GBL having the highest conductivity values across the tested temperature ranges. It was determined that electrolyte solutions containing S4 supplemented with EC at an 8:2 ratio with 0.5M LiPF$_6$ were immiscible at temperatures below 0° C. Similar results were observed for electrolyte solutions containing LiTFSI as a salt as shown in FIG. 4. Likewise, electrolyte solutions containing S4 and ethylene carbonate with 0.5M LiTFSI were immiscible below 10° C.

Example 5

Figure 5:
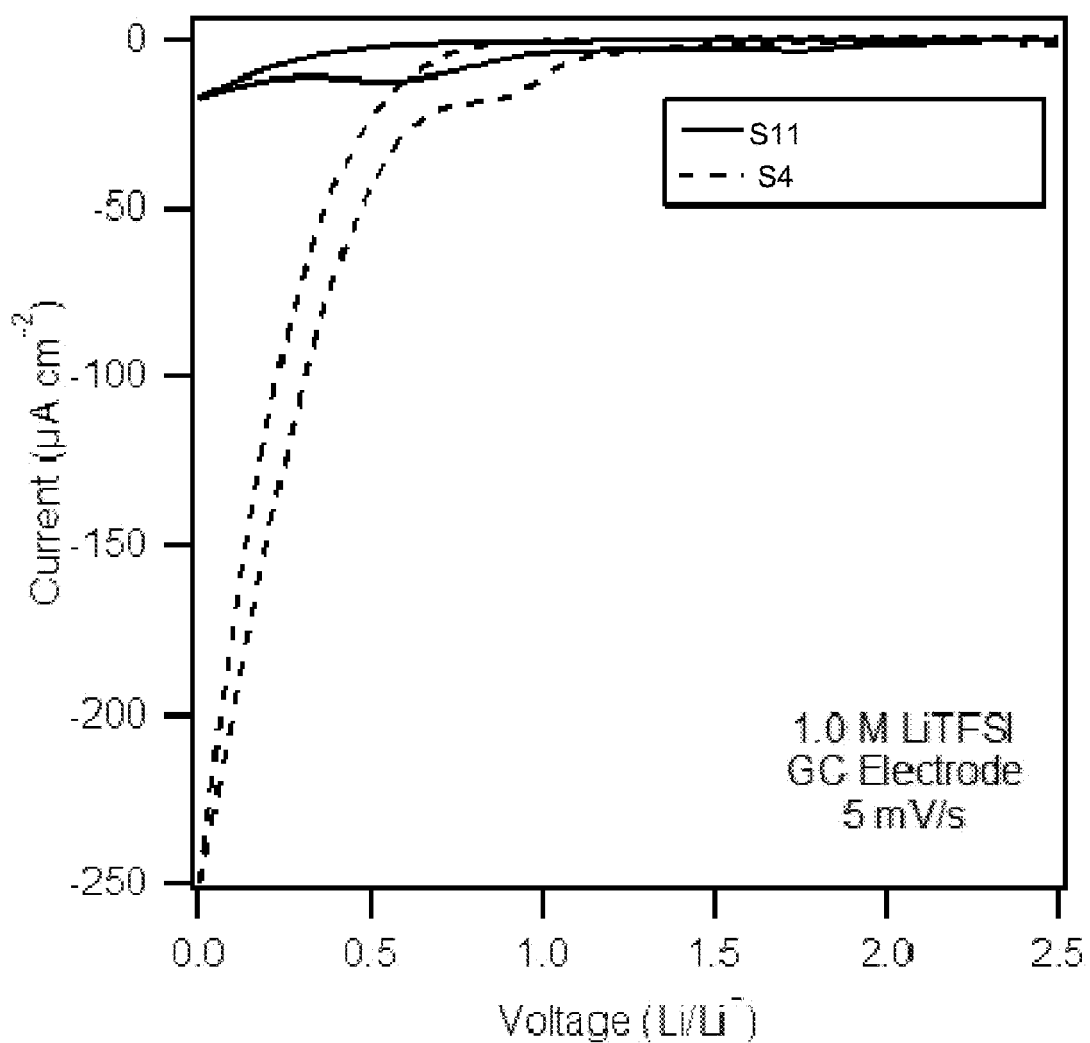
Figure 6:
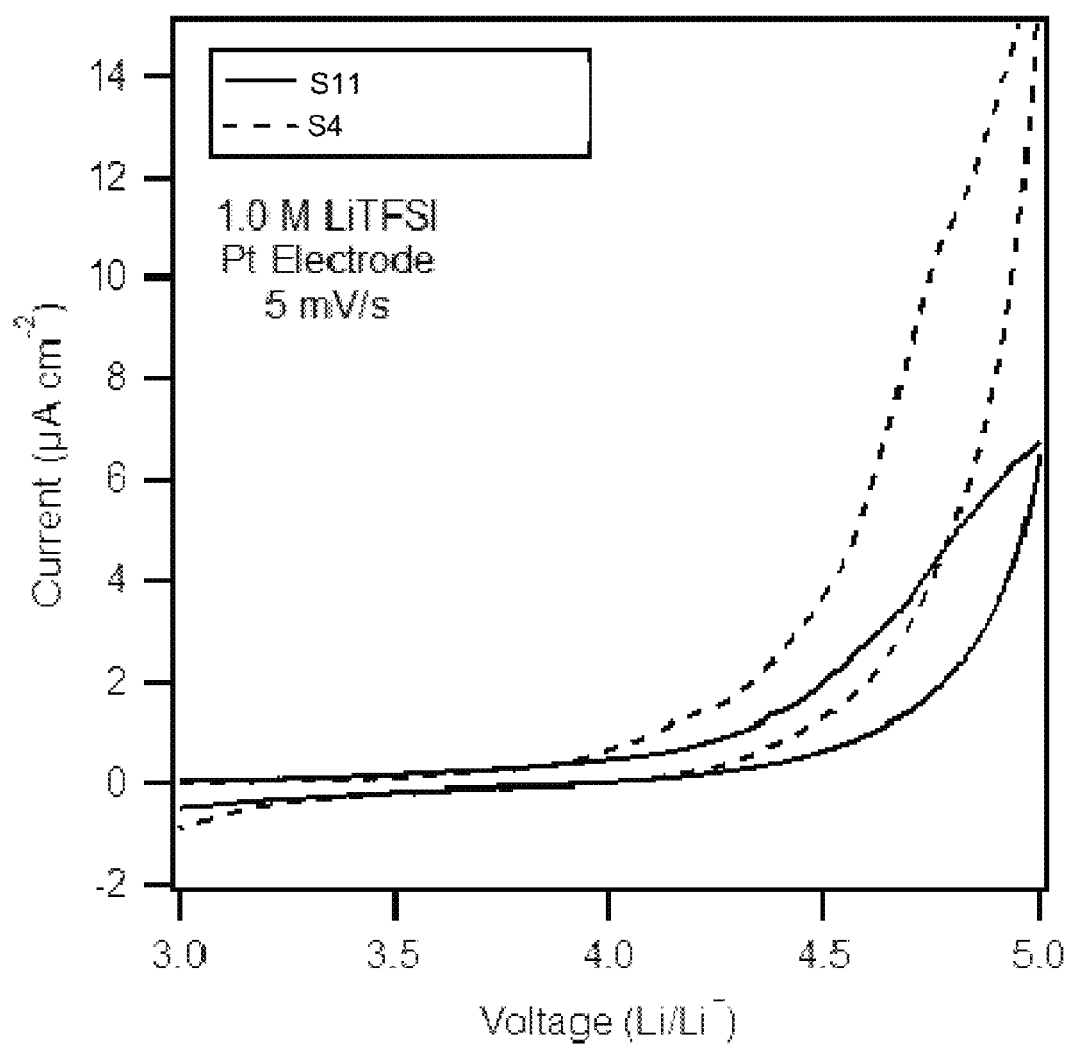

Cyclic Voltammetry of Ether-Linked Phosphate Substituted Perfluoropolyether Based Electrolyte Compositions The electrochemical stability of S11 and S4 with 1.0 M LiTFSI was tested. FIG. 5 shows the cathodic scan on a glassy carbon working electrode at 25° C. at 5 mV/s and FIG. 6 shows the anodic scan on a Pt working electrode at 25° C. at 5 mV/s.

Example 6

Figure 7:
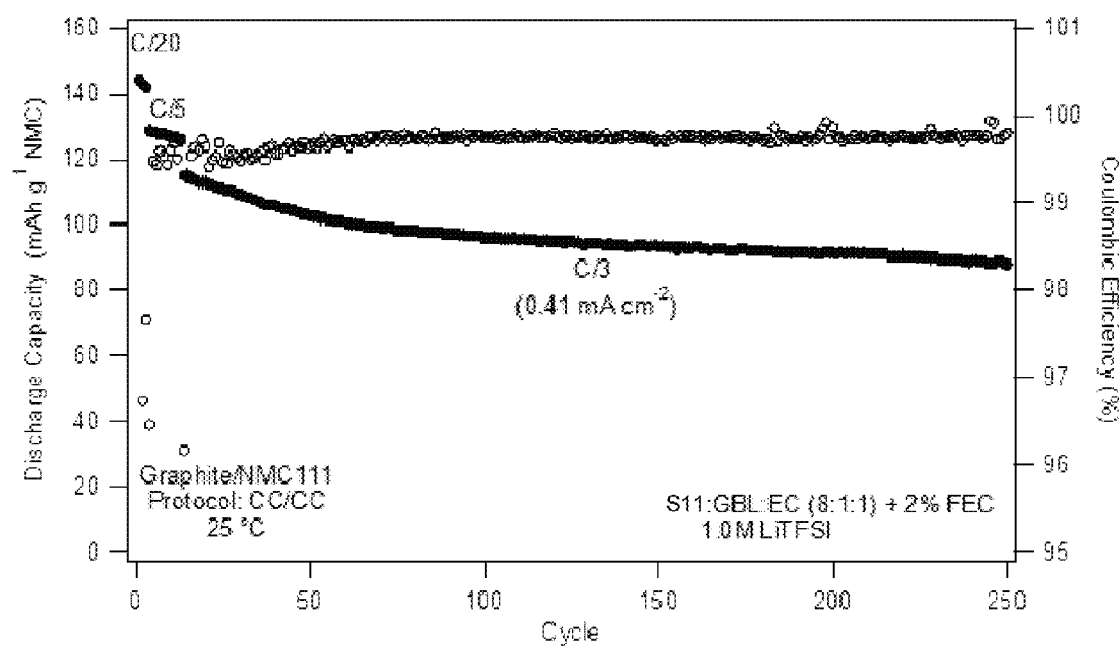

Cycling Performance and Stability of Ether-Linked Phosphate Substituted Perfluoropolyethers in Coin Cell Batteries The performance of electrolyte compositions containing structure S11 in a full coin cell battery was tested. The electrolyte compositions were supplemented with the conductivity enhancing additives GBL and EC and the SEI additive fluoroethylene carbonate (FEC) at a ratio of S11:GBL:EC of 8:1:1 and 2% FEC. The cycling experiments were carried out at room temperature with 1.0M LiTFSI. This composition was cycled in a graphite/lithium nickel manganese cobalt oxide (NMC) full coin cell battery at C/20, C/5, and C/3 discharge rates and the discharge capacity (left axis) and coulombic efficiency (right axis) was measured for up to 250 cycles (FIG. 7). A comparison of cycling efficiency and capacity of different electrolyte compositions comprising either S11 or S4 in coin cells is shown in Table 5.

TABLE 5

Cycling Efficiency and Capacity Comparison of Electrolyte Solutions

| Solvent Composition | Salt | Concen. (M) | SEI Additive (2% wt) | 1st Cycle Efficiency (%) | Initial Capacity (mAH/g) |
|---|---|---|---|---|---|
| EC:EMC = 30:70 | LiPF$_6$ | 1.0 | — | 76.1 | 141 |
| S11 = 100 | LiTFSI | 0.8 | FEC | 71.9 | 111 |
| S11:EC = 90:10 | LiTFSI | 0.8 | FEC | 74.7 | 134 |
| S11:GBL:EC = 80:10:10 | LiTFSI | 1.0 | FEC | 81.0 | 144 |
| S4 = 100 | LiTFSI | 0.8 | FEC | 28.7 | 36 |
| S4:EC = 90:10 | LiTFSI | 0.8 | FEC | 76.6 | 137 |

Example 7

Figure 8:
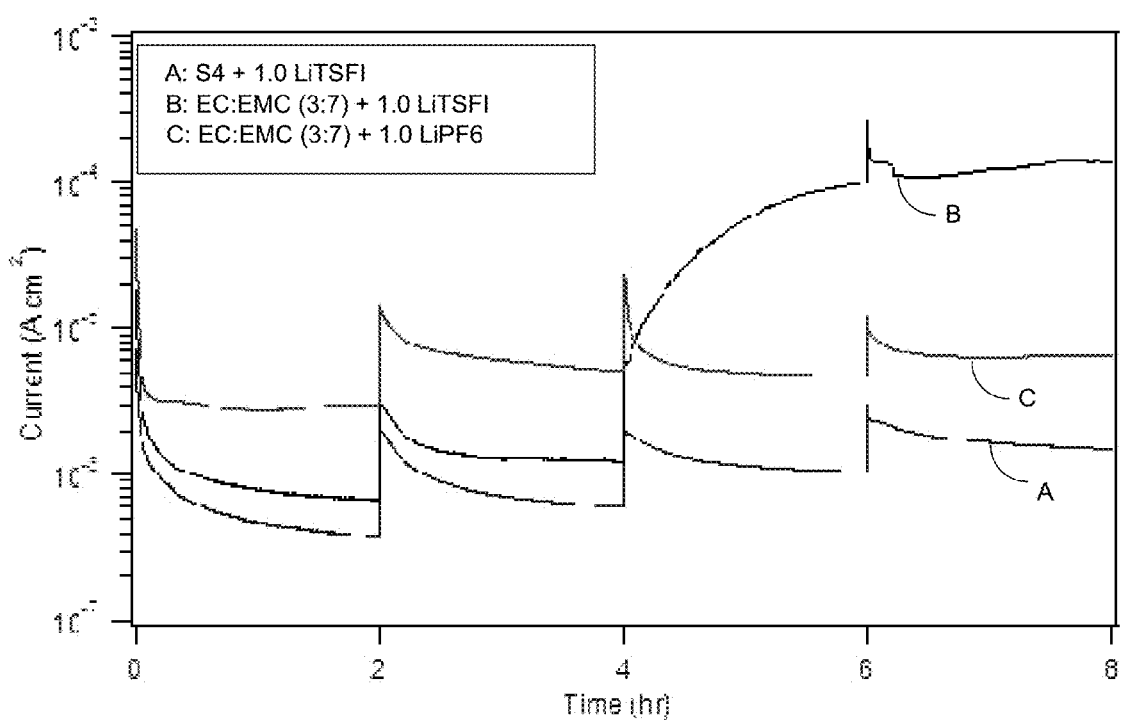
FIG. 8 Ether-linked phosphate substituted perfluoropolyether based electrolyte compositions suppression of aluminum current collector corrosion

Ether-Linked Phosphate Substituted Perfluoropolyethers Mediated Suppression of Aluminum Corrosion The suppression of aluminum corrosion in an electrolyte composition having LiTFSI and a linear perfluoropolyether according to structure S4 was tested. These experiments were performed by holding a constant voltage in a coin cell with an aluminum working electrode and a lithium metal counter/reference electrode. Any current observe is assumed to be the corrosion of the aluminum. The lower the current, the less corrosion is occurring. The extent of aluminum corrosion in electrolyte compositions with the PFPE and LiTFSI (curve A) was compared to a reference standard electrolyte standard composition of LiPF$_6$ in a mixture of ethylene carbonate/ethyl methyl carbonate (EC/EMC) (C) as shown in FIG. 8. The corrosion current values observed in the PFPE-based electrolyte compositions are lower than those observed in the reference electrolyte composition (C), which is widely used in commercial cells and known to suppress aluminum corrosion. Aluminum undergoes severe corrosion in the reference organic carbonate-based electrolyte composition (B).

An electrolyte solution comprising S11 and LiTFSI also demonstrated little or no corrosion of the aluminum current collector. Additionally, a delay in aluminum current collector corrosion detection when an electrolyte solution containing S4 was substituted with 10% EC as compared to a reference organic carbonate-based electrolyte composition and LiTFSI.

Example 8

Conductivity, Flammability, and Viscosity of PFPE-Phosphates

The conductivity, flash point, SET, and viscosity of structures S4 and S11 was determined.

| Molecule | MW | Viscosity (cP) at 20° C. | Flash Point (° C.) | SET (S) | Conductivity 1.0M LiTFSI @ 25° C. (mS/cm) |
|---|---|---|---|---|---|
| S11 | 656 | 17 | None | None | 0.07 |
| S4 | 390 | 6.7 | None | None | .37 |

What is claimed is:

1. A non-flammable liquid or solid electrolyte composition comprising:
   an electrolyte solvent including a functionally substituted perfluoropolyether according to Formula I or Formula II:

$$R_f\text{—}X_o\text{—}R' \quad (I)$$

$$R''\text{—}X_m\text{—}R_f\text{—}X_o\text{—}R' \quad (II)$$

wherein $R_f$ is a perfluoropolyether backbone having no C—H bonds,
   X is an alkyl, fluoroalkyl, ether, or fluoroether group, wherein 'm' and 'o' are each independently zero or an integer ≥1, and
   R" and R' are each independently selected from the group consisting of phosphate or phosphonate containing groups; and
   an alkali metal salt dissolved in the functionally substituted perfluoropolyether.

2. The electrolyte composition according to claim 1, wherein the functionally substituted perfluoropolyether has a number average molecular weight of about 200 g/mol to about 5,000 g/mol.

3. The electrolyte composition according to claim 1, wherein X comprises an ether linkage.

4. The electrolyte composition according to claim 1, wherein X is CH$_2$.

5. The electrolyte composition according to claim 1, wherein the phosphate or phosphonate containing groups comprise structure S1 or S2,

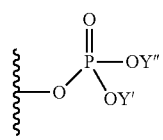

S1

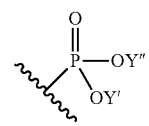

S2 wherein Y' and Y" represent an additional aliphatic, alkyl, aromatic, heterocyclic, phosphate, or phosphonate containing groups.

6. The electrolyte composition of claim 5, wherein Y' and Y" are each a methyl group according to structure S3

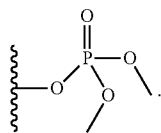

7. The electrolyte composition according to claim 1, wherein the functionally substituted perfluoropolyether is

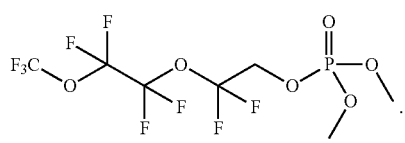

8. The electrolyte composition according to claim 1, wherein the functionally substituted perfluoropolyether is

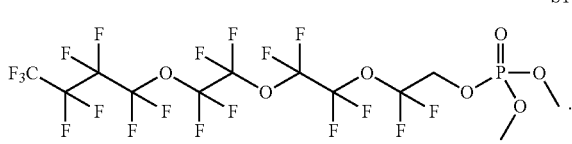

9. The electrolyte composition according to claim 1, wherein the functionally substituted perfluoropolyether is according to Formula I and R' is an unsubstituted lower alkyl linear phosphate or phosphonate-containing group.

10. The electrolyte composition according to claim 9, wherein X is an alkyl or ether group, and $R_f$ is a branched or unbranched linear perfluoropolyether having a number average molecular weight between 200 g/mol and 550 g/mol.

11. The electrolyte composition according to claim 1, wherein the functionally substituted perfluoropolyether comprises from about 10% to about 85% by weight of the non-flammable liquid or solid electrolyte composition.

12. The electrolyte composition according to claim 1, wherein the functionally substituted perfluoropolyether comprises from about 10% to about 25% by weight of the non-flammable liquid or solid electrolyte composition.

13. The electrolyte composition according to claim 1, wherein the functionally substituted perfluoropolyether comprises from about 40% to about 85% by weight of the non-flammable liquid or solid electrolyte composition.

14. The electrolyte composition according to claim 1, wherein the alkali metal salt comprises a lithium salt or a sodium salt.

15. The electrolyte composition according to claim 1, wherein the alkali metal salt is a lithium salt comprising $LiPF_6$ or LiTFSI or a mixture thereof.

16. The electrolyte composition according to claim 15, wherein $LiPF_6$ or LiTFSI or a mixture thereof comprises about 8% to about 35% by weight of the non-flammable liquid or solid electrolyte composition.

17. The electrolyte composition according to claim 1, further comprising at least one or more of a conductivity enhancing additive, a viscosity reducer, a high voltage stabilizer, a wettability additive, or a flame retardant, or a mixture or combination thereof.

18. The electrolyte composition according to claim 17, wherein the conductivity enhancing additive comprises ethylene carbonate (EC), propylene carbonate (PC), butylene carbonate (BC), fluoroethylene carbonate, γ-butyrolactone, or a mixture or combination thereof.

19. The electrolyte composition according to claim 17, wherein the conductivity enhancing agent comprises ethylene carbonate.

20. The electrolyte composition according to claim 17, wherein the conductivity enhancing additive comprises about 1% to about 40% by weight of the non-flammable liquid or solid electrolyte composition.

21. The electrolyte composition according to claim 17, wherein the high voltage stabilizer comprises 3-hexylthiophene, adiponitrile, sulfolane, lithium bis(oxalato)borate, γ-butyrolactone, 1,1,2,2-Tetrafluoro-3-(1,1,2,2-tetrafluoroethoxy)-propane, ethyl methyl sulfone, or trimethylboroxine or a mixture or combination thereof.

22. The electrolyte composition according to claim 17, wherein the wettability additive comprises triphenyl phosphite, dodecyl methyl carbonate, methyl 1-methylpropyl carbonate, methyl 2,2-dimethylpropanoate, or phenyl methyl carbonate or a mixture or combination thereof.

23. The electrolyte composition according to claim 17, wherein the flame retardant comprises trimethylphosphate, triethylphosphate, triphenyl phosphate, trifluoroethyl dimethylphosphate, tris(trifluoroethyl)phosphate, or mixture or combination thereof.

24. The electrolyte composition according to claim 17, wherein the viscosity reducer, high voltage stabilizer, and wettability additive each independently comprise about 0.5-6% of the non-flammable liquid or solid electrolyte composition and the flame retardant comprises about 0.5-20% of the non-flammable liquid or solid electrolyte composition.

25. The electrolyte composition according to claim 1, further comprising a non-phosphate or phosphonate-containing functionally substituted perfluoropolymer ether having one or more aliphatic, alkyl, aromatic, heterocyclo, amide, carbamate, carbonate, sulfone, or nitrile terminal end groups.

26. The electrolyte composition according to claim 25, wherein the functionally substituted perfluoropolyether according to Formula I or Formula II and the non-phosphate or phosphonate-containing functionally substituted perfluoropolymer ether together comprise at least 40% by weight of the electrolyte solvent.

27. The electrolyte composition according to claim 1, wherein the composition has an ionic conductivity of from 0.01 mS/cm to about 10 mS/cm at 25° C.

28. The electrolyte composition according to claim 1, wherein the composition has an ionic conductivity of from 0.1 mS/cm to about 3.0 mS/cm at 25° C.

29. The electrolyte composition according to claim 1, wherein the composition does not ignite when heated to a temperature of about 150° C. and subjected to an ignition source for at least 15 seconds.

30. A battery comprising:
(a) an anode;
(b) a separator;
(c) a cathode;
(d) at least one cathode current collector; and
(e) the non-flammable liquid or solid electrolyte composition according to claim 1.

* * * * *